(12) United States Patent
Tamir et al.

(10) Patent No.: US 10,210,772 B2
(45) Date of Patent: *Feb. 19, 2019

(54) TRAFFIC INFORMATION SYSTEM

(71) Applicant: Insurance Services Office, Inc., Jersey City, NJ (US)

(72) Inventors: Asaf Tamir, Rechovot (IL); Ido Topaz, Tel-Aviv (IL)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,636

(22) Filed: Apr. 11, 2017

(65) Prior Publication Data

US 2017/0221381 A1 Aug. 3, 2017

Related U.S. Application Data

(63) Continuation of application No. 14/182,568, filed on Feb. 18, 2014, now Pat. No. 9,619,203, which is a (Continued)

(51) Int. Cl.
*B60Q 1/00* (2006.01)
*G09B 19/16* (2006.01)
(Continued)

(52) U.S. Cl.
CPC ............. *G09B 19/167* (2013.01); *G06F 7/00* (2013.01); *G06Q 30/0283* (2013.01);
(Continued)

(58) Field of Classification Search
None
See application file for complete search history.

(56) References Cited

U.S. PATENT DOCUMENTS 3,504,337 A 3/1970 Ekman
4,067,061 A 1/1978 Juhasz
(Continued)

FOREIGN PATENT DOCUMENTS

EP 1136792 A2 9/2001
WO 90/02388 A1 3/1990
(Continued)

OTHER PUBLICATIONS

Written Opinion of the International Searching Authority issued in connection with International Application No. PCT/US13/54514, dated Feb. 25, 2014 (4 pages).
(Continued)

*Primary Examiner* — Julie Lieu
(74) *Attorney, Agent, or Firm* — McCarter & English, LLP

(57) ABSTRACT

A method of evaluating the driving behavior in a vehicle. The method includes determining values of a plurality of parameters of the operation of a first vehicle in a first road segment, determining values of the plurality of parameters for one or more second vehicles in a second road segment having similar properties to those of the first road segment, comparing the determined values of the first vehicle and the one or more second vehicles and providing an evaluation of the driving behavior of the first vehicle, responsive to the comparison.

20 Claims, 3 Drawing Sheets

Related U.S. Application Data continuation of application No. 13/334,132, filed on Dec. 22, 2011, now Pat. No. 8,653,986, which is a continuation of application No. 12/876,182, filed on Sep. 6, 2010, now Pat. No. 8,085,166, which is a continuation of application No. 10/563,703, filed as application No. PCT/IL2004/000610 on Jul. 7, 2004, now Pat. No. 7,821,421.

(60) Provisional application No. 60/484,667, filed on Jul. 7, 2003.

(51) Int. Cl.
  *G06Q 30/02* (2012.01)
  *G06Q 40/08* (2012.01)
  *G07C 5/00* (2006.01)
  *G07C 5/08* (2006.01)
  *G08G 1/0967* (2006.01)
  *G08G 1/16* (2006.01)
  *G06F 7/00* (2006.01)
  *G01S 19/40* (2010.01)
  *G08G 1/052* (2006.01)
  *G08G 1/0962* (2006.01)

(52) U.S. Cl.
  CPC ............ *G06Q 40/08* (2013.01); *G07C 5/008* (2013.01); *G07C 5/085* (2013.01); *G08G 1/09675* (2013.01); *G08G 1/096716* (2013.01); *G08G 1/096741* (2013.01); *G08G 1/096775* (2013.01); *G08G 1/096791* (2013.01); *G08G 1/164* (2013.01); *G01S 19/40* (2013.01); *G08G 1/052* (2013.01); *G08G 1/0962* (2013.01)

(56) References Cited

U.S. PATENT DOCUMENTS

| | | | |
|---|---|---|---|
| 4,234,926 A | 11/1980 | Wallace et al. | |
| 4,258,421 A | 3/1981 | Juhasz et al. | |
| 4,533,962 A | 8/1985 | Decker et al. | |
| 4,608,638 A | 8/1986 | Tsikos | |
| 4,638,295 A | 1/1987 | Middlebrook et al. | |
| 4,667,336 A | 5/1987 | Best | |
| 4,745,564 A | 5/1988 | Tennes et al. | |
| 4,763,745 A | 8/1988 | Eto et al. | |
| 4,807,179 A | 2/1989 | Clere et al. | |
| 4,829,434 A | 5/1989 | Karmel et al. | |
| 4,843,463 A | 6/1989 | Michetti | |
| 4,843,578 A | 6/1989 | Wade | |
| 4,853,720 A | 8/1989 | Onari et al. | |
| 4,939,652 A | 7/1990 | Steiner | |
| 4,987,541 A | 1/1991 | Levente et al. | |
| 4,992,943 A | 2/1991 | McCracken | |
| 5,055,851 A | 10/1991 | Sheffer | |
| 5,111,289 A | 5/1992 | Lucas et al. | |
| 5,189,621 A | 2/1993 | Onari et al. | |
| 5,223,844 A | 6/1993 | Mansell et al. | |
| 5,270,708 A | 12/1993 | Kamishima | |
| 5,319,374 A | 6/1994 | Desai et al. | |
| 5,365,451 A | 11/1994 | Wang et al. | |
| 5,430,432 A | 7/1995 | Camhi et al. | |
| 5,446,442 A | 8/1995 | Swart et al. | |
| 5,499,182 A * | 3/1996 | Ousborne | G06F 11/34 340/439 |
| 5,500,806 A | 3/1996 | Bellin et al. | |
| 5,544,053 A | 8/1996 | Nakashima | |
| 5,548,273 A | 8/1996 | Nicol et al. | |
| 5,550,551 A | 8/1996 | Alesio | |
| 5,638,273 A | 6/1997 | Coiner et al. | |
| 5,652,705 A | 7/1997 | Spiess | |
| 5,694,322 A | 12/1997 | Westerlage et al. | |
| 5,759,384 A | 6/1998 | Silveri | |
| 5,797,134 A * | 8/1998 | McMillan | G06Q 30/0283 705/4 |
| 5,815,071 A | 9/1998 | Doyle | |
| 5,835,008 A * | 11/1998 | Colemere, Jr. | B60Q 1/441 340/439 |
| 5,901,806 A | 5/1999 | Takahashi | |
| 5,956,717 A | 9/1999 | Kraay et al. | |
| 5,985,155 A | 11/1999 | Maitland | |
| 6,064,970 A * | 5/2000 | McMillan | G06Q 30/0283 340/439 |
| 6,226,592 B1 | 5/2001 | Luckscheiter et al. | |
| 6,438,491 B1 | 8/2002 | Farmer | |
| 6,502,020 B2 | 12/2002 | Lang | |
| 6,741,737 B1 | 5/2004 | Lenoir | |
| 6,829,672 B1 | 12/2004 | Deng et al. | |
| 6,832,156 B2 | 12/2004 | Farmer | |
| 6,836,719 B2 | 12/2004 | Andersson et al. | |
| 6,868,386 B1 * | 3/2005 | Henderson | G06Q 30/0283 340/439 |
| 6,931,309 B2 | 8/2005 | Phelan et al. | |
| 7,124,088 B2 | 10/2006 | Bauer et al. | |
| 7,211,176 B2 | 5/2007 | Hin et al. | |
| 7,215,941 B2 | 5/2007 | Beckmann et al. | |
| 7,324,951 B2 | 1/2008 | Renwick et al. | |
| 7,339,483 B1 * | 3/2008 | Farmer | G06Q 30/02 340/425.5 |
| 7,343,306 B1 | 3/2008 | Bates et al. | |
| 7,610,210 B2 | 10/2009 | Helitzer et al. | |
| 7,821,421 B2 * | 10/2010 | Tamir | G06Q 30/0283 340/425.5 |
| 7,877,269 B2 | 1/2011 | Bauer et al. | |
| 7,901,620 B2 | 3/2011 | Taguchi et al. | |
| 8,044,809 B2 * | 10/2011 | Farmer | G06Q 20/102 340/425.5 |
| 8,085,166 B2 * | 12/2011 | Tamir | G06Q 30/0283 340/425.5 |
| 8,090,597 B1 | 1/2012 | Pienkos | |
| 8,090,598 B2 * | 1/2012 | Bauer | G06Q 40/02 701/1 |
| 8,095,394 B2 | 1/2012 | Nowak et al. | |
| 8,140,358 B1 * | 3/2012 | Ling | G06Q 40/08 340/439 |
| 8,311,858 B2 | 11/2012 | Everett et al. | |
| 8,332,242 B1 | 12/2012 | Medina, III | |
| 8,484,046 B1 | 7/2013 | Bauer et al. | |
| 8,489,433 B2 | 7/2013 | Altieri et al. | |
| 8,554,587 B1 | 10/2013 | Nowak et al. | |
| 8,606,512 B1 | 12/2013 | Bogovich et al. | |
| 8,653,986 B2 * | 2/2014 | Tamir | G06Q 30/0283 340/438 |
| 8,712,795 B1 | 4/2014 | Bauer et al. | |
| 8,805,707 B2 | 8/2014 | Schumann, Jr. et al. | |
| 9,141,995 B1 | 9/2015 | Brinkmann et al. | |
| 9,165,326 B1 * | 10/2015 | He | B60K 28/066 |
| 9,619,203 B2 | 4/2017 | Tamir et al. | |
| 2001/0039509 A1 | 11/2001 | Dar et al. | |
| 2002/0019703 A1 | 2/2002 | Levine | |
| 2002/0035422 A1 | 3/2002 | Sasaki | |
| 2002/0111725 A1 | 8/2002 | Burge | |
| 2002/0151297 A1 * | 10/2002 | Remboski | B60R 16/0231 455/414.1 |
| 2002/0169529 A1 * | 11/2002 | Kim | G07C 5/085 701/31.4 |
| 2003/0130893 A1 | 7/2003 | Farmer | |
| 2003/0187704 A1 | 10/2003 | Hashiguchi et al. | |
| 2003/0195676 A1 | 10/2003 | Kelly et al. | |
| 2004/0022416 A1 * | 2/2004 | Lemelson | G01S 13/931 382/104 |
| 2004/0044450 A1 | 3/2004 | Taguchi et al. | |
| 2004/0103010 A1 | 5/2004 | Wahlbin et al. | |
| 2004/0139034 A1 * | 7/2004 | Farmer | G06Q 30/0283 705/400 |
| 2004/0153362 A1 | 8/2004 | Bauer et al. | |
| 2004/0236476 A1 | 11/2004 | Chowdhary | |
| 2004/0254698 A1 | 12/2004 | Hubbard et al. | |
| 2004/0260579 A1 * | 12/2004 | Tremiti | G06Q 40/08 705/4 |

(56) References Cited

U.S. PATENT DOCUMENTS

| | | | |
|---|---|---|---|
| 2005/0091175 A9* | 4/2005 | Farmer | G06Q 30/0283 705/400 |
| 2005/0131597 A1 | 6/2005 | Raz et al. | |
| 2005/0137757 A1 | 6/2005 | Phelan et al. | |
| 2005/0182538 A1 | 8/2005 | Phelan et al. | |
| 2006/0053038 A1 | 3/2006 | Warren et al. | |
| 2006/0095175 A1 | 5/2006 | deWaal et al. | |
| 2006/0106515 A1 | 5/2006 | Phelan et al. | |
| 2006/0111817 A1 | 5/2006 | Phelan et al. | |
| 2006/0122749 A1 | 6/2006 | Phelan et al. | |
| 2006/0253307 A1 | 11/2006 | Warren et al. | |
| 2007/0005404 A1* | 1/2007 | Raz | G06Q 40/00 705/4 |
| 2007/0027583 A1* | 2/2007 | Tamir | G06Q 30/0283 701/1 |
| 2007/0027726 A1 | 2/2007 | Warren et al. | |
| 2007/0120645 A1 | 5/2007 | Nakashima | |
| 2007/0132950 A1 | 6/2007 | Victor et al. | |
| 2007/0225912 A1 | 9/2007 | Grush | |
| 2007/0282638 A1 | 12/2007 | Surovy | |
| 2008/0052134 A1 | 2/2008 | Nowak et al. | |
| 2008/0294690 A1 | 11/2008 | McClellan et al. | |
| 2009/0024419 A1 | 1/2009 | McClellan et al. | |
| 2009/0109037 A1 | 4/2009 | Farmer | |
| 2009/0132294 A1 | 5/2009 | Haines | |
| 2010/0030582 A1 | 2/2010 | Rippel et al. | |
| 2010/0030586 A1 | 2/2010 | Taylor et al. | |
| 2010/0064373 A1 | 3/2010 | Cai et al. | |
| 2010/0094482 A1 | 4/2010 | Schofield et al. | |
| 2010/0094501 A1 | 4/2010 | Kwok | |
| 2010/0131300 A1 | 5/2010 | Collopy et al. | |
| 2010/0131302 A1 | 5/2010 | Collopy et al. | |
| 2010/0131304 A1 | 5/2010 | Collopy et al. | |
| 2010/0131305 A1 | 5/2010 | Collopy et al. | |
| 2010/0138244 A1 | 6/2010 | Basir | |
| 2010/0209890 A1 | 8/2010 | Huang et al. | |
| 2010/0268619 A1 | 10/2010 | Farmer | |
| 2010/0332266 A1* | 12/2010 | Tamir | G06Q 30/0283 705/4 |
| 2011/0106370 A1 | 5/2011 | Duddle et al. | |
| 2011/0161116 A1 | 6/2011 | Peak et al. | |
| 2011/0258044 A1 | 10/2011 | Kargupta | |
| 2012/0029945 A1 | 2/2012 | Altieri et al. | |
| 2012/0036038 A1* | 2/2012 | Farmer | G06Q 20/102 705/26.7 |
| 2012/0084103 A1 | 4/2012 | Altieri et al. | |
| 2012/0089423 A1* | 4/2012 | Tamir | G06Q 30/0283 705/4 |
| 2012/0158436 A1 | 6/2012 | Bauer et al. | |
| 2012/0209634 A1 | 8/2012 | Ling et al. | |
| 2013/0006469 A1 | 1/2013 | Green et al. | |
| 2013/0013347 A1 | 1/2013 | Ling et al. | |
| 2013/0013348 A1 | 1/2013 | Ling et al. | |
| 2013/0304519 A1 | 11/2013 | Altieri et al. | |
| 2014/0046701 A1 | 2/2014 | Steinberg et al. | |
| 2014/0058761 A1 | 2/2014 | Freiberger et al. | |
| 2014/0163848 A1 | 6/2014 | Tamir et al. | |
| 2014/0172467 A1* | 6/2014 | He | B60K 28/066 705/4 |
| 2014/0180727 A1 | 6/2014 | Freiberger et al. | |

FOREIGN PATENT DOCUMENTS

| | | |
|---|---|---|
| WO | 98/06080 A1 | 2/1998 |
| WO | 2005/003885 A2 | 1/2005 |
| WO | 2005/073926 A1 | 8/2005 |
| WO | 2007/128119 A1 | 11/2007 |
| WO | 2008/134888 A1 | 11/2008 |
| WO | 2008/141456 A1 | 11/2008 |
| WO | 2009/011857 A1 | 1/2009 |
| WO | 2010/062899 A1 | 6/2010 |
| WO | 2011/035799 A1 | 3/2011 |
| WO | 2012/080741 A1 | 6/2012 |

OTHER PUBLICATIONS

International Search Report of the International Search Authority issued in connection with International Application No. PCT/US13/54514, dated Feb. 25, 2014 (2 pages).
Reexamination Certificate issued in connection with Reexamination No. 90/011,252 of U.S. Pat. No. 6,064,970 dated Jan. 10, 2012 (3 pages).
Reexamination Certificate issued in connection with Reexamination No. 90/011,612 of U.S. Pat. No. 7,124,088 dated Sep. 4, 2012 (2 pages).
Reexamination Certificate issued in connection with Reexamination No. 90/011,619 of U.S. Pat. No. 7,877,269 dated Sep. 18, 2012 (2 pages).
Canadian Office Action issued in connection with Application No. 2,531,662, dated Mar. 2, 2012 (2 pages).
Intention to Grant issued in connection with European Application No. 04744950.9, dated Dec. 5, 2013 (6 pages).
Supplemental document to Intention to Grant issued in connection with European Application No. 04744950.9, dated Dec. 5, 2013 (56 pages).
Summons to attend oral proceedings based in connection with Application No. 04744950.9, mailed on May 16, 2013 (4 pages).
First European Official Action filed in accordance with Application No. 04744950.9, dated Jan. 13, 2010 (5 pages).
Second European Official Action filed in accordance with Application No. 04744950.9, dated Feb. 20, 2012 (5 pages).
European Result of Consultation filed in accordance with Application No. 04744950.9, mailed on Nov. 13, 2013 (4 pages).
Final Written Decision for Case CBM2012-00002 for U.S. Pat. No. 6,064,970 dated Jan. 23, 2014 (72 pages).
Final Written Decision for Case CBM2012-00004 for U.S. Pat. No. 6,064,970 dated Jan. 23, 2014 (54 pages).
Final Written Decision for Case CBM2012-00010 for U.S. Pat. No. 7,124,088 dated Feb. 24, 2014 (46 pages).
Final Written Decision for Case CBM2013-00002 for 7,877,269 dated Feb. 24, 2014 (48 pages).
Final Written Decision for Case CBM 2013-00004 for U.S. Pat. No. 8,090,598 dated Mar. 13, 2014 (69 pages).
Final Written Decision for Case CBM 2012-00003 for U.S. Pat. No. 8,140,358 dated Feb. 11, 2014 (70 pages).
Final Written Decision for Case CBM 2013-00009 for U.S. Pat. No. 8,140,358 dated Feb. 11, 2014 (51 pages).
Examiner initiated Interview Summary dated Nov. 21, 2013, issued in connection with U.S. Appl. No. 13/939,989 (1 page)
Office Action dated May 27, 2014, issued in connection with U.S. Appl. No. 13/939,989 (19 pages).
International Search Report of the International Search Authority issued in connection with PCT/IL04/00610 dated Nov. 17, 2005 (3 pages).
Written Opinion of the International Searching Authority issued in connection with PCT/IL04/00610 dated Nov. 17, 2005 (6 pages).
International Preliminary Report on Patentability issued in connection with PCT/IL04/00610 dated Jan. 9, 2006 (7 pages).
Office Action dated Jan. 13, 2014, issued in connection with U.S. Appl. No. 13/195,237 (19 pages).
Office Action dated Jun. 23, 2015, issued in connection with U.S. Appl. No. 13/195,237 (29 pages).
Office Action dated Sep. 30, 2014, issued in connection with U.S. Appl. No. 13/195,237 (18 pages).
About Drivesync, printout from http://www.drivesync.com/about-drivesynch.htm, Intelligent Mechatronic Systems, 2008 (1 page).
Final Office Action dated Aug. 5, 2015 from pending U.S. Appl. No. 13/972,134 (30 pages).
Final Office Action dated May 12, 2015 from pending U.S. Appl. No. 13/964,568 (11 pages).
Final Office Action dated Apr. 8, 2015 from pending U.S. Appl. No. 14/049,837 (9 pages).
International Preliminary Report on Patentability issued in connection with PCT/US2013/054514 dated Feb. 17, 2015 (5 pages).
International Preliminary Report on Patentability issued in connection with PCT/US2013/055947 dated Feb. 24, 2015 (5 pages).

(56) References Cited

OTHER PUBLICATIONS

Office Action dated Mar. 19, 2015, issued in connection with U.S. Appl. No. 13/939,989 (26 pages).
Interview Summary dated Nov. 26, 2013, issued in connection with U.S. Appl. No. 13/939,989 (3 pages).
Office Action dated Feb. 19, 2016, issued in connection with U.S. Appl. No. 13/964,568 (15 pages).
Office Action dated Aug. 25, 2016, issued in connection with U.S. Appl. No. 13/964,568 (16 pages).
Office Action dated Sep. 14, 2016, issued in connection with U.S. Appl. No. 14/049,837 (11 pages).
Notice of Allowance dated Nov. 30, 2016, issued in connection with U.S. Appl. No. 14/182,568 (7 pages).
Office Action dated Mar. 29, 2018, issued by the Canadian Patent Office Action in connection with Canadian Application No. 2,925,145 (5 pages).
International Preliminary Report on Patentability dated Sep. 18, 2014, issued in connection International Application No. PCT/US13/64097 (28 pages).
Written Opinion of the International Searching Authority issued in connection with International Application No. PCT/US13/64097, dated Mar. 11, 2014 (4 pages).
International Search Report of the International Search Authority issued in connection with International Application No. PCT/US13/64097, dated Mar. 11, 2014 (2 pages).
International Search Report of the International Search Authority issued in connection with International Application No. PCT/US13/55947, dated Feb. 7, 2014 (3 pages).
Written Opinion of the International Searching Authority issued in connection with International Application No. PCT/US13/55947, dated Feb. 7, 2014 (4 pages).
European Search Report dated Feb. 20, 2015, issued in connection with European Patent Application No. 12820469.6 (6 pages).
Office Action dated Mar. 1, 2016, issued in connection with U.S. Appl. No. 14/182,568 (5 pages).
Office Action dated Sep. 26, 2014, issued in connection with U.S. Appl. No. 13/972,134 (30 pages).
Office Action dated Sep. 16, 2014, issued in connection with U.S. Appl. No. 14/049,837 (10 pages).
Office Action dated Nov. 4, 2014, issued in connection with U.S. Appl. No. 13/964,568 (12 pages).
Office Action dated Jun. 19, 2015, issued in connection with U.S. Appl. No. 14/182,568 (9 pages).
Response dated Jun. 1, 2011 to Office Action dated Feb. 1, 2010 From the Israel Patent Office Re: Application No. 172989 (22 pages).
Amendment Under 37 CFR 1.312 dated Aug. 19, 2010 Further to Notice of Allowance dated May 21, 2010 From the US Patent and Trademark Office Re. U.S. Appl. No. 10/563,703 (6 pages).
Communication Pursuant to Article 94(3) EPC dated Jan. 13, 2010 From the European Patent Office Re.: Application No. 04744950.9 (5 pages).
Office Action dated Feb. 1, 2010 From the Israel Patent Office Re.: Application No. 172989 and Its Translation Into English (5 pages).
Response dated Jul. 12, 2010 to Communication Pursuant to Article 94(3) EPC dated Jan. 13, 2010 From the European Patent Office Re.: Application No. 04744950.9 (20 pages).
Response dated Nov. 30, 2009 to Official Action dated May 29, 2009 From the US Patent and Trademark Office Re.: U.S. Appl. No. 10/563,703 (6 pages).
Supplementary European Search Report dated Sep. 30, 2009 From the European Patent Office Re: Application No. 04744950.9 (3 pages).
Notice of Allowance dated May 21, 2010 issued in connection with U.S. Appl. No. 10/563,703 (4 pages).
Office Action dated Jan. 18, 2012 From the Israel Patent Office Re.: Application No. 172989 and Its Translation Into English (3 pages).
Communication Pursuant to Article 94(3) EPC dated Feb. 20, 2012 From the European Patent Office Re.: Application No. 04744950.9 (5 pages).
Requisition by the Examiner Dated Mar. 2, 2012 From the Canadian Intellectual Property Office Re. Application No. 2,531,662 ( pages).
Notice of Allowance dated Aug. 22, 2011, issued in connection with U.S. Appl. No. 12/876,182 (5 pages).
Office Action dated Dec. 20, 2010, issued in connection with U.S. Appl. No. 12/876,182 (12 pages).
Response dated May 19, 2011 to Official Action dated Dec. 20, 2010 From the US Patent and Trademark Office Re.: U.S. Appl. No. 12/876,182 (12 pages).
Office Action dated May 29, 2009, issued in connection with U.S. Appl. No. 10/563,703 (9 pages).
Notice of Allowance dated Jan. 26, 2010, issued in connection with U.S. Appl. No. 10/563,703 (4 pages).
Notice of Allowance dated Sep. 6, 2013, issued in connection with U.S. Appl. No. 13/334,132 (7 pages).
Office Action dated Jan. 14, 2013, issued in connection with U.S. Appl. No. 13/334,132 (5 pages).
Office Action dated Jun. 5, 2012, issued in connection with U.S. Appl. No. 13/334,132 (11 pages).
Office Action dated Dec. 4, 2015, issued in connection with U.S. Appl. No. 13/939,989 (34 pages).
Anonymous, "Readers rate mileage idea", Daily Breeze [Torrance, California] dated Sep. 4, 2008, pp. 1-2 (2 pages).
Hickman, "They're tracking us down", The Ottawa Citizen [Ottawa, Ontario] dated Nov. 2006, pp. 1-4 (4 pages).
Farrow "Pick a route to cheaper car cover with premiums on the up, drivers are resorting to telling lies to keep the cost down. But there are legitimate ways of saving money on insurance, says Paul Farrow", The Sunday Telegraph [London (UK)], Jul. 15, 2007, pp. 1-2 (2 pages).
Voelker, Michael P., "Spinning Their Wheels: Usage-based auto insurance has had trouble gaining traction, dogged by consumer's concerns around privacy and insurers' technology challenges. Is the time right for telematics?", Techdecisions forInsurance, Feb. 2009, pp. 1-4 (4 pages).
Xu, et al., "Privacy-Conscious Location-Based Queries in Mobile Environments," IEEE Transactions on Parallel and Distributed Systems, vol. 21, Issue 3, Mar. 2010 (14 pages).
Gruteser, et al., "Privacy-Aware Location Sensor Networks," Proceedings of the 9th Conference on Hot Topics in Operating Systems, vol. 9 (2003) (5 pages).
Mokbel, et al., "The New Casper: A Privacy-Aware Location-Based Database Server," Proceedings of the 32nd International Conference on Very Large Data Bases (2006) (2 pages).
Drivesync Solutions, Changing the Future of Driving Become Part of the Change, printout from http://www.drivesync.com/index.htm, Intelligent Mechatronic Systems, 2008 (1 page).
Drivesync Solutions, printout from http://www.drivesync.com/solutions.htm, Intelligent Mechatronic Systems, 2008 (1 page).
About IMS, printout from http://www.drivesync.com/ims.htm, Intelligent Mechatronic Systems, 2008 (1 page).
Press Release entitled: "ISO Expands Its Predicitive Analytics Offerings with the Environmental Module of ISO Risk Analyzer Personal Auto," Jan. 8, 2008 (2 pages).
International Search Report of the International Searching Authority dated Sep. 27, 2012, issued in connection with International Patent Application No. PCT/US12/49225 (5 pages).
Written Opinion of the International Searching Authority dated Sep. 27, 2012, issued in connection with International Patent Application No. PCT/US12/49225 (6 pages).
Office Action dated Jul. 17, 2012, issued in connection with U.S. Appl. No. 13/195,237 (16 pages).
Office Action dated Feb. 15, 2012, issued in connection with U.S. Appl. No. 13/195,237 (17 pages).
Office Action dated May 8, 2013, issued in connection with U.S. Appl. No. 13/195,237 (14 pages).
Office Action dated Apr. 11, 2012, issued in connection with U.S. Appl. No. 12/846,552 (15 pages).
Interview Summary dated Oct. 19, 2012, issued in connection with U.S. Appl. No. 12/846,552 (3 pages).

(56) References Cited

OTHER PUBLICATIONS

Notice of Allowance dated May 24, 2013, issued in connection with U.S. Appl. No. 12/846,552 (16 pages).

* cited by examiner

TRAFFIC INFORMATION SYSTEM

RELATED APPLICATIONS

This application is a continuation of U.S. patent application Ser. No. 14/182,568 filed on Feb. 18, 2014, now U.S. Pat. No. 9,619,203, which is a continuation of U.S. patent application Ser. No. 13/334,132 filed on Dec. 22, 2011, now U.S. Pat. No. 8,653,986, which is a continuation of U.S. patent application Ser. No. 12/876,182 filed on Sep. 6, 2010, now U.S. Pat. No. 8,085,166, which is a continuation of U.S. patent application Ser. No. 10/563,703 filed on Jul. 21, 2006, now U.S. Pat. No. 7,821,421, which is a National Phase of PCT Patent Application No. PCT/IL2004/000610 having an International Filing Date of Jul. 7, 2004, which claims the benefit of priority under 35 USC § 119(e) of U.S. Provisional Patent Application No. 60/484,667 filed on Jul. 7, 2003.

The disclosures of the above applications are incorporated herein by reference.

FIELD OF THE INVENTION

The present invention relates to traffic monitoring systems.

BACKGROUND OF THE INVENTION

Many systems are used to monitor the operation of vehicles.

U.S. Pat. No. 6,487,500 to Lemelson et al., the disclosure of which is incorporated herein by reference, describes a collision avoiding and warning system. An accurate differential GPS unit is used to determine the location of a controlled vehicle, as well as the locations of other controlled vehicles. The position of the vehicle may also be compared to a predetermined map with the locations of objects that may be potential parties in a collision (e.g., telephone poles). When a collision is imminent, the system provides a warning to the driver and/or takes control over the vehicle to avoid the collision.

In one embodiment, the warning system warns the driver when dangerous behavior is identified, such as driving much faster or much slower than other vehicles currently on the road.

In another embodiment, a display in the vehicle shows a map of the road on which the vehicle is located, together with information such as road conditions and weather conditions.

The system is suggested to include a black-box unit which records the last few minutes of the operation of the vehicle, for analysis after an accident.

Although the above monitoring and warning systems may save many lives, by reducing the number of car accidents, systems of these types are not widely employed.

US patent publication 2004/0032334 to Haq, the disclosure of which is incorporated herein by reference, describes a system for identifying when a driver falls asleep and which applies a visual and audio alarm to awake sleeping drivers.

GB patent publication 2,384,062, the disclosure of which is incorporated herein by reference, describes an automatic vehicle mechanism, such as an adaptive cruise control, automatic transmission or automatic braking that adapts to the driving style of the driver.

US patent publication 2004/0024444 to Hiyama et al., the disclosure of which is incorporated herein by reference, describes a safe driving support apparatus that provides advice to the driver based on vehicle data (e.g., vehicle speed, yaw rate, acceleration) and operation data (e.g., depression angle of acceleration throttle).

GB patent publication 2,328,820, the disclosure of which is incorporated herein by reference, describes a distance monitoring system that measures the distance to neighboring vehicles, the speed of the monitored vehicle and the weather conditions and provides warnings when sufficient distance is not kept from neighboring vehicles.

U.S. Pat. No. 6,064,970 to McMillan et al., the disclosure of which is incorporated herein by reference, describes a system for determining the cost of insurance for a vehicle. An on-board computer monitors various driving parameters, such as speed, use of safety equipment, brake use, types of road driven, driver identity, etc. The system also keeps track of events, such as accidents, times at which the vehicle is exceeding the speeding limit, presence of alcohol, non-use of turn signals and ABS application without an accident. The monitored data is used periodically to determine the amount of money to be charged for insuring the vehicle.

U.S. Pat. No. 6,404,351 to Beinke, the disclosure of which is incorporated herein by reference, describes an emergency vehicle warning system.

U.S. Pat. No. 6,447,132 to Harter the disclosure of which is incorporated herein by reference, describes a heads up display for vehicles.

SUMMARY OF THE INVENTION

An aspect of some embodiments of the invention relates to a method of evaluating the driving behavior in a vehicle. The method includes collecting driving information from a plurality of vehicles and evaluating the driving behavior of a first vehicle based on information from at least one other vehicle or to a statistical analysis of multiple other vehicles. Optionally, the comparison is to behavior of another vehicle performed at a different time and/or at a different location than of the first vehicle.

In some embodiments of the invention, the collecting of driving information from the plurality of vehicles comprises collecting from at least 10, 50 or even 100 vehicles, such that several extraordinary behaving vehicles do not interfere with the evaluation and/or their information can be identified and discarded.

In some embodiments of the invention, the comparison to other vehicles is used in determining whether a specific driver behavior is dangerous. Optionally, a behavior performed by a significant percentage (e.g., 30%, 50%, 80%) of the drivers passing at a specific road segment is not considered dangerous. For example, instead of comparing the speed of the vehicle to the speed limit, the vehicle's speed is compared to the speed of other vehicles under same conditions, e.g., road, time, light and/or weather conditions.

In some embodiments of the invention, the comparison to other vehicles is used for mapping road information, such as the locations of obstacles, curves and traffic signs. The location of a stop-line of a stop sign is optionally determined statistically from the positions at which a plurality of vehicles stop.

Optionally, the information from all relevant vehicles is given same weight in the evaluation of the vehicle behavior. Alternatively, information from different vehicles is given different weight. Optionally, vehicles of similar model to the vehicle being evaluated are given higher weight in the evaluation. Alternatively or additionally, vehicles that have a high safety rating (i.e., they are considered as usually being driven properly) are given more weight in the evaluation.

An aspect of some embodiments of the invention relates to a system for analyzing the driving behavior of a vehicle based on both sensor readings of the operation of the vehicle and structural information on the road on which the vehicle is passing. The analysis includes comparing to the behavior of vehicles in same or similar conditions. Using both structural information on the road and information on how the road was traversed, provides detailed information on the behavior of the driver with relation to the conditions of the road.

In some embodiments of the invention, the structural information on the road includes indications of curves in the road. Alternatively, the structural information includes indication of an intersection and/or road bumps.

In some embodiments of the invention, the comparison includes comparing to the same vehicle or to other vehicles in the same location at other times. Alternatively or additionally, the comparison is to behavior of vehicles at other locations, similar to the analyzed location.

The analysis optionally includes determining the speed at which the vehicle enters a specific structural road portion, such as a curve, a bump, a down-hill slope or an intersection.

In some embodiments of the invention, the analysis is based on the behavior of the vehicle in a plurality of similar structural road portions. For example, the percentage of curves taken properly by the driver may be determined.

In some embodiments of the invention, the results of the analysis are used to determine insurance rates for the vehicle and/or to evaluate the driving skills of the driver. Alternatively or additionally, the results of the analysis are used to generate warnings to the driver. The comparison to the behavior of other vehicles and/or to the behavior of the vehicle in previous cases allows better filtering of the warnings, so as to minimize the number of warnings while providing the important warnings. Similarly, the comparison allows better estimation of the safety of drivers and hence giving more accurate insurance rates.

An aspect of some embodiments of the invention relates to apparatus for displaying within a vehicle, information on traffic signs applicable to the vehicle. Displaying information on the applicable traffic signs within the vehicle, allows the driver better information on the applicable traffic signs and/or better awareness to the traffic signals.

The traffic signs optionally include directive signs, such as stop signs, yield signs, no U-turn signs and no entrance signs. Alternatively or additionally, the traffic signals include warning signs, such as curve up ahead and/or informative signs, such as one way street. In some embodiments of the invention, the traffic signals include traffic lights.

In some embodiments of the invention, the in-vehicle display presents some or all of the signs that are presently seen outside the vehicle. Alternatively or additionally, the in-vehicle display shows some or all of the signs that are currently applicable. For example, the speed limit is optionally shown even when not passing near a speed limit sign. Similarly, warnings of upcoming curves are optionally shown until the curve has been encountered.

In some embodiments of the invention, signs are identified using image processing on images collected by a camera on the vehicle. Alternatively or additionally, the vehicle carries a database of sign locations and the signs to be displayed are determined from the location of the vehicle, for example as determined using a GPS receiver. Optionally, warnings on the road state are displayed even when there are no corresponding traffic signs. Thus, the in-vehicle display provides more information than the traffic signs on the road sides. In some embodiments of the invention, the display is terminated after a predetermined time. Alternatively, the display is terminated when sensors on the vehicle determine that the area of applicability was passed already, for example by identifying that a curve was reached or passed by accelerometers mounted on the vehicle.

The display optionally shows all applicable traffic directives. Alternatively, the display shows only some of the applicable traffic directives, such as the most important directive. In an exemplary embodiment of the invention, when there is no specific warning, the speed limit is shown. When a curve is approached, a warning of the curve is displayed instead of the speed limit. Alternatively or additionally, a suggested speed for the curve is shown. The suggested speed may be preset for the specific curve or may be calculated based on the driver's driving habits.

In some embodiments of the invention, the current state of an upcoming traffic light is displayed in the vehicle. Alternatively or additionally, information on the timing of the change of the traffic light is displayed. Optionally, the time until the light is to turn green is displayed, optionally in the form of a count down. Alternatively or additionally, the time that the light will remain green is displayed. In some embodiments of the invention, an indication on whether the driver will reach the light while it is still green is provided.

In some embodiments of the invention, the displayed information includes indication of whether a lane may be used by any car or only by public transportation or cars having more than a predetermined number of passengers, according to the current time.

In some embodiments of the invention, the display shows information not included on any physical sign. Optionally, the displayed information includes indications of the history of a road, such as the number of accidents occurring on the current road in the past year.

In some embodiments of the invention, the display indicates whether it is allowed to park in the location of the vehicle and whether at the current time the parking is free or must be paid for.

A broad aspect of some embodiments of the invention relates to providing a low cost apparatus for monitoring the driving behavior in a vehicle. Rather than directly determining some information using expensive apparatus, the apparatus uses less accurate information and/or receives less accurate information from an indirect source and supplements the less accurate information from a second source in order to achieve sufficiently accurate information.

An aspect of some embodiments of the invention relates to an apparatus for monitoring the driving behavior in a vehicle, which uses information from an accelerometer and/or a speedometer in order to supplement an inaccurate location sensor (e.g., a low resolution GPS). Using accelerometer readings from an accelerometer, possibly used for other purposes, costs less than using high accuracy correction methods of the GPS location signals. Although possibly not as accurate, the location results are of sufficient quality to determine the location of the vehicle for purposes of driving analysis, for example for determining stopping at a stop sign.

In some embodiments of the invention, accelerometer readings are used in generating interpolation and/or extrapolation position values, so as to have more frequent samplings than available using standard GPS. In some embodiments of the invention, the coordinates from the GPS are corrected based on correction factors from a look up table, based on the speed and/or acceleration of the vehicle at the time the GPS readings were acquired.

An aspect of some embodiments of the invention relates to an apparatus for monitoring the driving behavior in a vehicle, which uses weather information from a forecast station in order to make a probabilistic determination on the weather-affected driving conditions encountered by the vehicle. Using a weather forecast and/or station report rather than real time weather information from sensors mounted on the vehicle can be significantly cheaper, while possibly providing less accurate information.

An aspect of some embodiments of the invention relates to an apparatus for monitoring safety distance keeping of a vehicle without measuring the distance between the vehicle and other vehicles. In some embodiments of the invention, the distance keeping behavior is monitored according to the braking behavior of the monitored vehicle, for example based on measurements of an accelerometer. Each case of abrupt braking is optionally analyzed to determine whether it is possibly (or likely) attributable to other conditions, such as approaching an intersection, passing near pedestrians that may jump into the road and/or coming to a stop of the driving. Optionally, the number of times the driver performed abrupt braking, which could not be attributed to other conditions, is determined and accordingly a distance keeping score is provided. Alternatively or additionally, each braking occasion is given a probability score that it relates to not keeping proper distance and the score is generated as a sum or average of the scores of the brakings. Using accelerometers is generally much cheaper than distance measurement apparatus.

An aspect of some embodiments of the invention relates to an apparatus for monitoring the behavior of a vehicle with relation to the road structure, which includes a database of limited road information that is not sufficient to draw a map of the roads. As the vehicles must pass on the roads, it is possible in some embodiments of the invention to perform meaningful analysis, without having a mapping of the roads. Optionally, the mapping information includes coordinates of points of interest, such as intersections, curves and traffic signs. In some embodiments of the invention, each intersection and curve is represented by at most 4-5 points, optionally by only a single coordinate.

An aspect of some embodiments of the invention relates to an apparatus for monitoring the driving behavior in a vehicle. Although the apparatus collects information that can be derived directly from mechanisms of the vehicle, the apparatus does not connect to the mechanisms of the vehicle, but rather collects the information using independent sensors. The use of independent sensors makes the installation of the monitoring apparatus simpler and non-intrusive to the vehicle.

In some embodiments of the invention, braking of the vehicle is determined by an accelerometer rather than by connecting to the brakes. Optionally, the speed is determined from GPS readings rather than from the vehicle speedometer. Turning is optionally determined from lateral acceleration of the vehicle, rather than by connecting to the steering wheel or the vehicle computer.

In some embodiments of the invention, a decision on insurance rates of a vehicle is given based on readings from an on-board monitoring unit not connected to mechanisms of the vehicle for collecting data.

An aspect of some embodiments of the invention relates to determining road, traffic and/or other transportation infrastructure related information based on information collected on the behavior of vehicles using the infrastructure. Optionally, the information is collected from monitoring units on a plurality of vehicles. Alternatively or additionally, the information is collected by long distance cameras which identify vehicles but do not see traffic signs and/or the state of traffic lights.

In some embodiments of the invention, the collected information includes information on road points at which a relatively large number of vehicles undergo abnormal behavior, such as emergency braking or skidding.

In some embodiments of the invention, the collected information includes the location of directive signs and/or warning signs. Optionally, the collected information includes the location of a stop sign and/or of a stop line associated with a traffic light or stop sign. Alternatively or additionally, the location of a yield sign is determined according to determination of locations at which cars slow to a great extent. In some embodiments of the invention, the behavior of vehicles entering an intersection from different directions are analyzed and accordingly it is determined whether there are stop signs or yield signs and in which entrance points to the intersection they are located.

The information is optionally collected off-line, without relation to the monitoring of a specific vehicle. Alternatively or additionally, the collected information is analyzed to determine the location of the directive or warning traffic signal, at the time at which the information is required.

In some embodiments of the invention, the information on the behavior of vehicles is collected to verify existing mapping information and/or to correct the existing mapping information. Optionally, if more than a predetermined percentage of vehicles pass through what is known to be a red light, the information on the light timings is invalidated. This may be due to operation of police or may be due to skew in the traffic light timing. In some embodiments of the invention, the timing of the traffic lights is determined from the behavior of the monitored vehicles. In some embodiments of the invention, the data is used for temporary invalidation of the mapping information. In other embodiments of the invention, the collected data is used for permanent replacement of incorrect mapping information.

An aspect of some embodiments of the invention relates to protecting the privacy of drivers. In some embodiments of the invention, information collected by a vehicle monitoring system is automatically destroyed or condensed, a predetermined time after the information was collected. In some embodiments of the invention, the collected information is analyzed to extract information on the vehicle, which is not linked to a specific timing event (i.e., date, time and location). Thereafter, the collected data is discarded, or is changed to prevent identification of the vehicle to which it relates, in order to prevent any possible harm to the driver's privacy. Optionally, the information does not leave the vehicle before specific information which can aid in identifying the time and location of the driving is removed. Alternatively, the information is provided to a control station that is obliged not to make backups of the data before it is condensed.

The driver optionally may request that the information not be discarded, for example if the collected information may be useful for the driver in court.

An aspect of some embodiments of the invention relates to a warning unit that provides warnings to a vehicle driver in a manner which is not perceptible by other passengers of the vehicle. Optionally, warnings are provided by a display not seen by passengers due to its location (e.g., on the steering wheel) and/or by a display that can only be seen from a limited set of angles. Alternatively or additionally, warnings are provided using tactile indications, for example from a unit in the steering wheel, the driver's seat belt and/or under the driver's seat.

An aspect of some embodiments of the invention relates to a heads up display (HUD), which displays information to a vehicle driver on the windshield by reflecting light from the windshield, without altering the area of the windshield used for the display. Optionally, the display area of the windshield is formed of the same material as other areas of the windshield and is not coated with a different coating than the surrounding windshield areas.

In some embodiments of the invention, the HUD includes light sensors on the windshield, or in its vicinity, which provide lighting information used in adjusting the light intensity and/or angle of the projection. Alternatively or additionally, the wavelength and/or color of the projection is adjusted responsive to the lighting conditions. The sensors optionally provide information on total light conditions (such as day, night or fog). Alternatively or additionally, the sensors provide information on light beams directed at the windshield, for example from other vehicles. The dynamic adjustment of the display allows using the HUD even without altering the windshield, thus allowing for much simpler installation and lower HUD cost.

An aspect of some embodiments of the invention relates to a driver warning system which selects the warnings to be displayed to the driver based on a driver profile.

In some embodiments of the invention, the driver warning system determines the number of warnings to be displayed and/or the display timing according to the driver profile. Alternatively or additionally, the driver warning system determines which warnings to display according to the driver profile. In an exemplary embodiment of the invention, the responsiveness of the driver to warnings is determined and accordingly the display of the warnings is adjusted. Alternatively or additionally, the driver expertise in handling curves, intersections and/or other driving challenges is determined, and accordingly a determination is made on which warnings are to be displayed to the driver. For example, an expert in handling curves does not require curve warnings.

The driver profile optionally includes demographic information, such as age and gender. Alternatively or additionally, the driver profile is generated responsive to information collected on previous driving behavior of the driver. In some embodiments of the invention, the same processor used for generating the warnings is used in calculating the driver profile. Alternatively or additionally, the processor generating the warnings participates in collecting and/or transmitting the data used in determining the driver profile. Optionally, the driver profile is generated without using direct preference input from the driver.

In some embodiments of the invention, the driver profile includes a long term profile and a short term profile relating to recent actions.

Optionally, the driver profile of a vehicle includes a plurality of sub-profiles relating to different drivers and/or to different moods of driving, for example according to the types of roads being traversed, the time of day and/or the actual driver mood. Optionally, in each driving session, the driving of an opening period is used to identify the sub-profile of the driver in the current session, for example according to the speed of driving, the way the steering wheel is held and/or the acceleration patterns. Alternatively or additionally, the sub-profile is determined based on the road which is being driven on.

An aspect of some embodiments of the invention relates to a driving monitoring system that collects data on driving behavior of a vehicle and performs real time analysis for providing warnings on the driving behavior as well as automatic report generation of the driving behavior.

In some embodiments of the invention, the data is collected by an on-board monitoring unit which performs the real time analysis, while the automatic report generation is performed by a control station not on the vehicle. Alternatively or additionally, both the report generation and the warning analysis are performed on-board or by the control station.

Optionally, the warnings are displayed to the driver. Alternatively or additionally, the warning are transmitted to a parent of the driver, to a fleet manager and/or to an owner of the vehicle.

The report is optionally based on a plurality of driving incidents for which warnings were generated. Alternatively or additionally, the report is at least partially based on the driving over a relatively long period, for example at least a day, a week and/or at least two or three driving sessions.

In some embodiments of the invention, the report relates to the reaction of the driver to the warnings. Alternatively or additionally, the report relates to changes in the driver's driving habits over time.

An aspect of some embodiments of the invention relates to a method of evaluating the driving behavior in a vehicle. The evaluation includes monitoring the driving behavior of the vehicle over a plurality of events and comparing the collected information of different events to dynamically adjusted thresholds. By using dynamically adjusted thresholds, the evaluation of the driving relates to specific dangerous events rather than collecting general nature statistics.

In some embodiments of the invention, the monitoring includes collecting information on the speed of the vehicle. The dynamic threshold compares the speed of the vehicle to the speed limit or to the prevailing speed at the specific road segment. Alternatively or additionally, the dynamic threshold is adjusted according to the curvature of the road, the weather conditions and/or other information that affects the proper speed of the vehicle.

In some embodiments of the invention, the monitoring includes collecting information on the braking habits of the driver of the vehicle. Optionally, the dynamic threshold is adjusted according to the traffic load on the road. When the vehicle is in a traffic jam, frequent brakings are expected and are optionally weeded out of the collected information.

An aspect of some embodiments of the invention relates to a method of evaluating the driving of a vehicle, for example for insurance purposes, based on an analysis of the behavior of the vehicle with relation to traffic lights, changing lanes, overtaking and/or tailgating.

The analysis with relation to traffic light behavior optionally includes analysis of whether the vehicle passed through red lights, whether the drivers speeds up toward green lights, how the driver reacts to yellow lights and/or blinking green light (indicating the light will soon turn yellow).

An aspect of some embodiments of the invention relates to a method of evaluating the driving of a vehicle, for example for insurance purposes, based on an analysis of the slowing down habits toward dangerous road segments, such as steep down-hill slopes, curves, stop signs and/or other road hazards.

An aspect of some embodiments of the invention relates to monitoring the driving behavior of a vehicle using, at least partially, topographical data on traversed roads, e.g., location of slopes and possibly their slope.

An aspect of some embodiments of the invention relates to analyzing the driving of a vehicle based on a plurality of parameters related to how the vehicle behaves in road curves. Optionally, the parameters include two or more of lateral deceleration in curves, speed on approaching curves, frontal deceleration upon approaching the curve and distance or time at which the deceleration before the curve begins.

An aspect of some embodiments of the invention relates to a vehicle-mounted apparatus for monitoring vehicle behavior, which wirelessly transmits collected information to a remote monitoring station. The vehicle-mounted monitoring apparatus screens the collected information in order to reduce the amount of data transmitted wirelessly.

In some embodiments of the invention, the data evaluation is based at least partially on externally collected data from a control station remote from the vehicle. Optionally, at least some of the externally collected data is transmitted to the vehicle-mounted apparatus, in order to perform the screening of the collected information. In an alternative embodiment, the vehicle-mounted apparatus screens the data without the external data and screening that requires external data is performed by the monitoring station.

Optionally, sensor readings below a predetermined threshold are not transmitted. In some embodiments of the invention, a dynamic threshold is used according to the road conditions. For example, more accuracy may be required near intersections. In some embodiments of the invention, accelerometer readings that do not result in velocity change are discarded.

In some embodiments of the invention, samples are collected at a dynamically adjusted rate. The rate of sampling is optionally determined according to the location of the driving, for example accumulating more samples at areas where there many accidents or near intersections. Alternatively or additionally, the rate of sampling is adjusted according to the time of day, date and/or external conditions, such as weather conditions. Further alternatively or additionally, the rate of sampling is adjusted according to the driving behavior of the vehicle, for example increasing the sampling rate when reckless driving is identified.

An aspect of some embodiments of the invention relates to a vehicle monitoring system that is used to provide the driver and/or owner with a report on the level of expertise of the driver. In some embodiments of the invention, the monitoring system provides information on wear and tare of various vehicle elements, such as clutch and/or brakes. Optionally the report also provides suggestions on how to improve the driving and/or reduce gasoline usage.

An aspect of some embodiments of the invention relates to a driving analysis system that relates to the RPM of the motor of a vehicle (e.g., a truck) in analyzing the driving of the vehicle. Optionally, warnings are produced when the RPM is too high in entering a zone where the vehicle needs to slow down. In some embodiments of the invention, the warnings include suggestions on using the truck's retarder and/or on a speed to be reached before entering a problematic road segment. Alternatively or additionally, a fleet manager report provides information on the RPM of the vehicle when entering specific road zones, such as slopes, curves and/or junctions.

In some embodiments of the invention, the analysis differentiates between different road segments.

An aspect of some embodiments of the invention relates to a method of analyzing the safety and/or handling of a vehicle based on a periodic inspection of the vehicle.

There is therefore provided in accordance with an exemplary embodiment of the invention, a method of evaluating the driving behavior in a vehicle, comprising determining values of a plurality of parameters of the operation of a first vehicle in a first road segment, determining values of the plurality of parameters for one or more second vehicles in a second road segment having similar properties to those of the first road segment, comparing the determined values of the first vehicle and the one or more second vehicles and providing an evaluation of the driving behavior of the first vehicle, responsive to the comparison.

Optionally, the plurality of parameters includes at least one parameter which relates to braking or decelerating of the first vehicle before a road point requiring deceleration. Optionally, the plurality of parameters includes at least one parameter which relates to a time or distance before a road point requiring deceleration at which the first vehicle began to decelerate. Optionally, the plurality of parameters includes at least one parameter related to behavior at a road curve. Optionally, the method includes generating warnings to a driver of the first vehicle responsive to the evaluation.

Optionally, the method includes calculating insurance rates for the first vehicle responsive to the evaluation. Optionally, the method includes providing a report to a fleet manager responsive to the evaluation. Optionally, the method includes providing a report to a parent of the driver responsive to the evaluation. Optionally, the plurality of vehicles comprise at least 10 second vehicles. Optionally, the second road segment comprises the first road segment. Optionally, the second road segment is different from the first road segment.

Optionally, determining values of the plurality of parameters for the one or more second vehicles comprises determining at a different time from the determining of the parameters for the first vehicle. Optionally, the one or more second vehicles comprises a plurality of vehicles. Optionally, comparing the determined values of the first vehicle and the plurality of second vehicles comprises comparing the values of the first vehicle to a statistical analysis of values of the plurality of second vehicles.

Optionally, comparing the determined values of the first vehicle and the plurality of second vehicles comprises comparing in a manner which gives different weight to different ones of the second vehicles. Optionally, comparing the determined values of the first vehicle and the plurality of second vehicles comprises comparing in a manner which gives more weight to second vehicles having a specific safety rating.

Optionally, comparing the determined values of the first vehicle and the plurality of second vehicles comprises comparing data determined under similar weather, light or time conditions.

There is further provided in accordance with an exemplary embodiment of the invention, a method of evaluating the driving behavior in a vehicle, comprising receiving sensor readings on the operation of a first vehicle in a first road segment, determining structural information on the first road segment and analyzing a behavior of the first vehicle responsive to the sensor readings and the structural information, by comparing to behavior of one or more vehicles under similar circumstances.

Optionally, the method includes generating warnings to a driver of the first vehicle responsive to the analyzing. Optionally, the method includes calculating insurance rates for the first vehicle responsive to the analyzing. Optionally, the method includes generating a driving behavior report for a driver of the vehicle responsive to the analyzing. Optionally, receiving sensor readings comprises receiving from an accelerometer. Optionally, receiving sensor readings comprises receiving from a location sensor. Optionally, determining structural information comprises determining a slope of the first road segment. Optionally, determining structural information comprises determining a location of a curve or an intersection. Optionally, determining structural information comprises determining a parameter of a curve or an intersection. Optionally, comparing to behavior of one or more vehicles under similar conditions comprises comparing to acts of the first vehicle at a different time. Optionally, comparing to behavior of one or more vehicles under similar conditions comprises comparing to acts of the vehicles other than the first vehicle. Optionally, comparing to behavior of one or more vehicles under similar conditions comprises comparing to acts performed at different times than represented by the sensor readings.

There is further provided in accordance with an exemplary embodiment of the invention, a method of aiding safe driving, comprising determining traffic directives or warnings applicable to a vehicle; and providing the determined traffic directives or warnings in the vehicle. Optionally, the method includes determining the location of the vehicle and wherein determining the directives is performed responsive to the determined location. Optionally, providing the determined directives or warnings comprises providing an indication of a directive not currently visible outside the vehicle at the location. Optionally, determining the directives or warnings comprises determining traffic signs at the location.

Optionally, providing the determined directives or warnings comprises providing an indication of an upcoming stop or yield sign. Optionally, providing the determined directives or warnings comprises providing status or timing information of traffic lights. Optionally, providing the determined directives or warnings comprises providing a speed limit applicable to a current location of the vehicle. Optionally, determining the traffic directives comprises determining responsive to a time of the providing.

Optionally, the method includes determining whether a driver profile of the vehicle requires the warning and wherein the providing is performed only if the driver profile was determined to warrant the providing. Optionally, providing the determined directives or warnings comprises providing only if it is determined that the vehicle is probably going to violate the directive or already violated the directive. Optionally, determining the directives or warnings comprises determining by image analysis of images acquired by a camera mounted on the vehicle. Optionally, determining the directives or warnings comprises determining by accessing a database which lists the locations of directives, with coordinates of a current location of the vehicle. Optionally, the database does not include sufficient information to determine the geographical layout of roads. Optionally, providing the directive or warning comprises displaying a directive or warning.

Optionally, providing the directive or warning comprises sounding a directive or warning. Optionally, providing the directive or warning comprises providing a tactile stimulus.

There is further provided in accordance with an exemplary embodiment of the invention, an apparatus determining the location of a vehicle, comprising a location determination unit, which continuously provides coordinate readings of the vehicle and a processor adapted to calculate interpolated or extrapolated coordinate values responsive to the coordinate readings of the location determination unit.

Optionally, the processor is adapted to calculate the interpolated or extrapolated values responsive to at least one dynamic vehicle parameter of the vehicle at the time of a coordinate reading from the location determination unit. Optionally, the at least one dynamic vehicle parameter comprises one or more of the speed acceleration and azimuth of the vehicle.

Optionally, the apparatus includes an accelerometer, and wherein the processor uses readings from the accelerometer in calculating the coordinate values.

There is further provided in accordance with an exemplary embodiment of the invention, an apparatus for determining the location of a vehicle, comprising a location determination unit, which provides coordinate readings of the vehicle, a look up table including correction values for the coordinate readings responsive to dynamic vehicle parameters of the vehicle and a processor adapted to calculate corrected coordinate values from the coordinate readings using the look up table.

Optionally, the look up table provides correction values for vehicle speed values.

There is further provided in accordance with an exemplary embodiment of the invention, an apparatus for monitoring vehicle driving, comprising at least one sensor adapted to determine dynamic parameters of a vehicle, an input interface adapted to receive a weather or traffic load report of a region in which the vehicle is located; and a processor adapted to provide an indication on the vehicle behavior responsive to the determined dynamic parameters and the received weather or traffic load report.

Optionally, the processor is adapted to adjust a speed threshold responsive to the weather or traffic report. Optionally, the weather or traffic report relates to more than a single road segment.

There is further provided in accordance with an exemplary embodiment of the invention, a method of analyzing safety distance keeping of a vehicle, comprising collecting information on deceleration events of the vehicle, assigning each of the deceleration events a score indicative of a probability that the deceleration was due to not keeping sufficient distance from an adjacent vehicle; and providing a distance keeping score to the vehicle responsive to the events and assigned scores.

Optionally, collecting the information comprises collecting readings of an accelerometer on the vehicle. Optionally, assigning a score to a deceleration event comprises determining the location of the deceleration and determining a probability of deceleration at the location. Optionally, assigning a score to a deceleration event comprises determining a severity of the deceleration.

There is further provided in accordance with an exemplary embodiment of the invention, an apparatus for monitoring vehicle driving, comprising at least one sensor adapted to determine dynamic parameters of a vehicle, a location determination unit for providing coordinates of the vehicle, a database of locations of interest for driving analysis; and a processor which analyzes the driving responsive to comparison of coordinates from the location determination unit with locations in the database, the database does not include sufficient data to show the geographical path of roads traversed by the vehicle.

Optionally, the apparatus is mounted entirely on the vehicle.

Optionally, the location determination unit comprises a GPS receiver.

Optionally, the database represents each road segment in the database by at most four coordinates. Optionally, the database represents curves by a single coordinate pair. Optionally, the database represents intersections by a single coordinate pair. Optionally, the database indicates locations of traffic signs. Optionally, the database indicates locations of relatively steep slopes.

There is further provided in accordance with an exemplary embodiment of the invention, a method of providing a driving behavior score, comprising installing a monitoring unit in a vehicle, without connecting data reception ports of the monitoring unit to mechanisms of the vehicle, collecting dynamic vehicle parameters of the vehicle by the monitoring unit, analyzing the vehicle driving behavior of the vehicle responsive to the collected dynamic parameters from the monitoring unit; and assigning a score responsive to the analyzing.

Optionally, the monitoring unit is not connected through wires to the vehicle, other than any power connection. Optionally, collecting the dynamic vehicle parameters comprises determining vehicle acceleration, speed, location and azimuth. Optionally, the method includes assigning an insurance rate to the vehicle responsive to the score.

There is further provided in accordance with an exemplary embodiment of the invention, a method of determining parameters of road segments of interest, comprising receiving dynamic parameters of a plurality of vehicles together with corresponding locations, determining a location at which a plurality of vehicles have similar values of the dynamic parameters; and assigning the determined location a location-description responsive to the similar values of the dynamic parameters.

Optionally, determining the location comprises determining a location at which the received dynamic parameters of some of the vehicles do not indicate the location description determined for the location.

Optionally, assigning the location description comprises determining that the location has an intersection, a traffic sign, a traffic light or a curve.

Optionally, assigning the location description comprises assigning at least one parameter of the curve to the location. Optionally, assigning the location description comprises determining that the location has a slope. Optionally, assigning the location description comprises determining that the location has a yield sign.

There is further provided in accordance with an exemplary embodiment of the invention, a method of handling vehicle monitoring information, comprising accumulating data on the driving of a vehicle, which data identifies at least two of driving time, driving locations and driving dynamic parameters with the vehicle; and storing the accumulated data in a memory unit, with instructions to destroy at least identification information which may link the accumulated data to the vehicle, within a predetermined time.

Optionally, the method includes analyzing the data to generate a general report on the driving profile of the vehicle, which report does not link the vehicle to specific driving events.

Optionally, the accumulated data is discarded immediately after the analyzing is completed. Optionally, the accumulated data is timed to be discarded within at most twelve hours from its accumulation. Optionally, the vehicle owner may give an instruction to prevent the discarding of the data. Optionally, the data discarding is scheduled without a mechanism for aborting the discarding.

There is further provided in accordance with an exemplary embodiment of the invention, a driver warning unit, comprising a monitoring unit that determines warnings to be provided to a driver of a vehicle; and an output unit adapted to provide warnings determined by the monitoring unit to a driver of the vehicle, such that the warnings are not noticeable by other passengers in the vehicle, sitting in a same passenger cabin as the driver.

Optionally, the monitoring unit determines the warnings to be provided responsive to a location of the vehicle. Optionally, the output unit comprises a display that can only be viewed from a limited angle span. Optionally, the output unit comprises a display positioned on the steering wheel. Optionally, the output unit comprises a tactile stimulus provider.

Optionally, the monitoring unit determines the warnings to be provided responsive to dynamic parameters of the vehicle. Optionally, the monitoring unit determines the warnings to be provided without relation to dynamic parameters of the vehicle.

There is further provided in accordance with an exemplary embodiment of the invention, a method of providing warnings to a driver, comprising determining road conditions which may affect a vehicle, providing a driver profile of the vehicle; and selecting warnings to be provided to a driver of the vehicle or times at which the warnings are to be provided, responsive to the determined road conditions and the driver profile. Optionally, determining the road conditions comprises determining a location of the vehicle. Optionally, determining the road conditions comprises identifying signs applicable to the vehicle. Optionally, determining road conditions which may affect the vehicle comprises determining dynamic parameters of the vehicle. Optionally, determining road conditions which may affect the vehicle comprises determining a safety hazard.

Optionally, determining road conditions which may affect the vehicle comprises determining without relation to dynamic parameters of the vehicle.

Optionally, the driver profile is generated responsive to analysis of previous driving of the vehicle or the driver. Optionally, the driver profile comprises the age of the driver.

Optionally, selecting warnings to be provided to the driver comprises selecting warnings that the driver has previously not ignored.

Optionally, selecting a time of providing the warning comprises selecting according to an expected time required by the driver to respond to the warning.

Optionally, selecting warnings to be provided to the driver comprises selecting responsive to previous experience of the driver in handling the determined road conditions.

There is further provided in accordance with an exemplary embodiment of the invention, a driving monitoring system, comprising at least one sensor adapted to collect data on the driving of a vehicle, a warning generator adapted to generate driver warnings responsive to readings of the at least one sensor, an output unit for providing warnings generated by the warning generator; and a report generator adapted to analyze the driving behavior of the vehicle based on readings of the at least one sensor.

Optionally, the report generator is included in a same processing unit with the warning generator. Optionally, the report generator is not on board the vehicle, while the warning generator is mounted on the vehicle. Optionally, the at least one sensor comprises a location determination sensor. Optionally, the at least one sensor comprises an accelerometer.

Optionally, the at least one sensor comprises a camera.

Optionally, warning generator is adapted to generate the warnings responsive to the analysis of the report generator. Optionally, the report generator performs the analysis responsive to sensor readings of at least an hour. Optionally, the output unit displays the warnings to the driver. Optionally, the output unit provides the warnings to a person remote from the vehicle.

There is further provided in accordance with an exemplary embodiment of the invention, a method of assigning a safety score to a vehicle, comprising collecting information on the driving behavior of the vehicle, analyzing the collected information so as to determine the behavior of the vehicle with relation to at least one of relating to traffic lights, changing lanes, overtaking and tailgating; and assigning a score to the vehicle responsive to the analysis.

Optionally, collecting the information comprises collecting dynamic parameter values from sensors on the vehicle. Optionally, analyzing the collected information comprises determining a number of times that the vehicle passed through a yellow or red light.

Optionally, analyzing the collected information comprises determining a number of times that the vehicle responded with a delay to a change of a traffic light to green.

Optionally, the method includes determining an insurance rate for the vehicle responsive to the score. Optionally, determining the insurance rate is performed additionally responsive to a physical examination of the vehicle.

There is further provided in accordance with an exemplary embodiment of the invention, a method of assigning a safety score to a vehicle, comprising collecting information on the driving behavior of the vehicle, analyzing the collected information so as to determine at least one parameter of the slowing down of the vehicle toward road segments that require slowing down; and assigning a score to the vehicle responsive to the analysis. Optionally, analyzing the collected information comprises determining a number of times in which the vehicle did not slow down on time. Optionally, analyzing the collected information comprises determining an average distance before the road segments at which the vehicle begins to slow down. Optionally, the road segment that requires slowing down comprises a slope. Optionally, the road segment that requires slowing down comprises a curve.

Optionally, the road segment that requires slowing down comprises an intersection.

There is further provided in accordance with an exemplary embodiment of the invention, a method of analyzing vehicle behavior, comprising collecting information on the driving behavior of the vehicle, identifying topographical attributes of roads traversed by the vehicle; and analyzing the collected information so as to determine information on the driving behavior of the vehicle with relation to topographical road attributes.

Optionally, the analyzing is performed responsive to a location of a steep slope or an angle of a steep slope.

There is further provided in accordance with an exemplary embodiment of the invention, a method of assigning a safety score to a vehicle, comprising collecting information on the driving behavior of the vehicle, determining the location of a curve, analyzing the collected information so as to determine a plurality of parameters of the behavior of the vehicle with relation to the curve; and assigning a score to the vehicle responsive to the analysis.

Optionally, the plurality of parameters include at least one of lateral deceleration in the curve, the vehicle speed on approaching the curve, frontal deceleration of the vehicle upon approaching the curve and distance or time at which the vehicle began to decelerate before the curve.

BRIEF DESCRIPTION OF FIGURES

Particular non-limiting exemplary embodiments of the invention will be described with reference to the following description of embodiments in conjunction with the figures, in which.

DETAILED DESCRIPTION OF EMBODIMENTS

Figure 1:
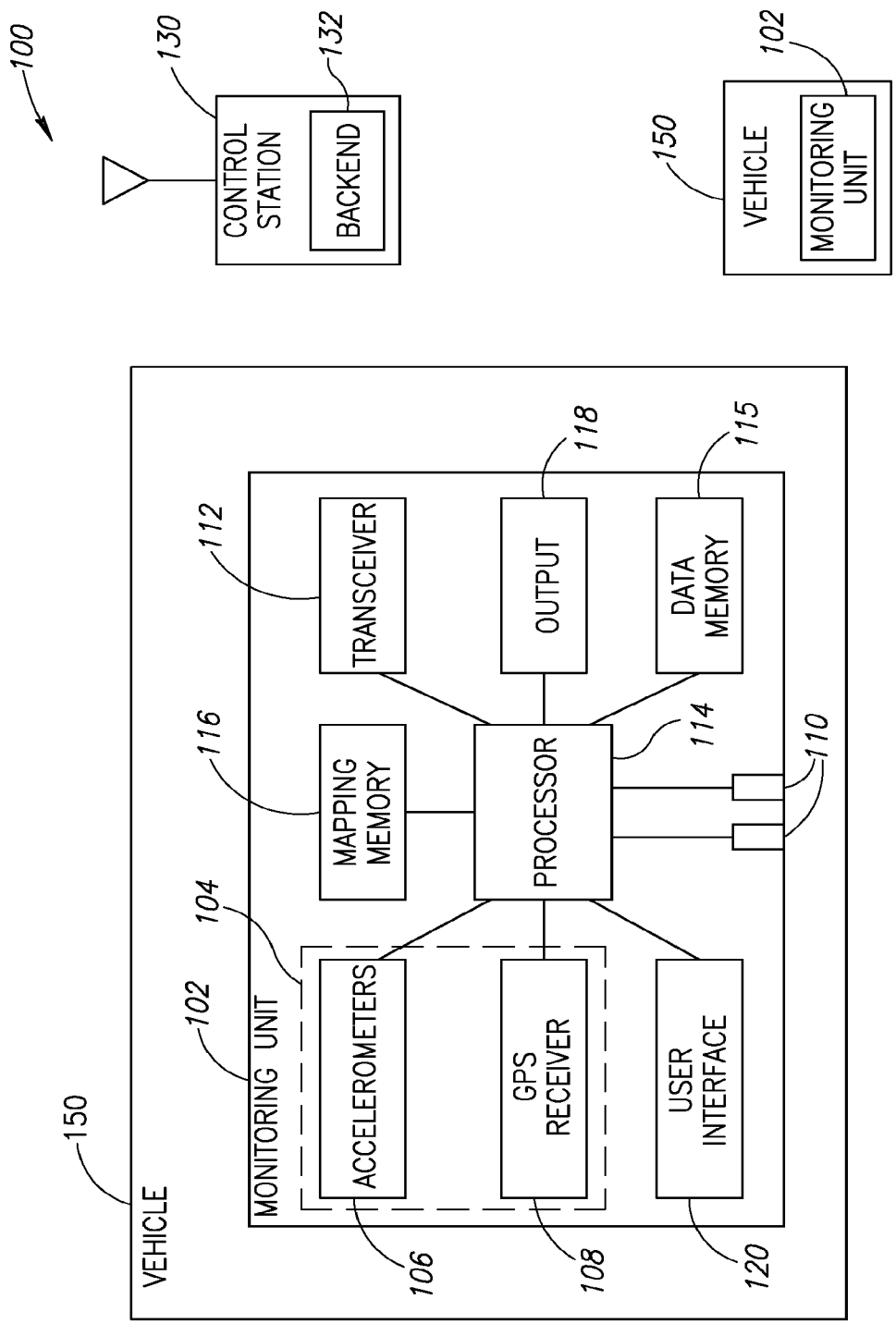
FIG. 1 is a schematic illustration of a vehicle monitoring system, in accordance with an exemplary embodiment of the invention.

FIG. 1 is a schematic illustration of a vehicle monitoring system 100, in accordance with an exemplary embodiment of the invention. System 100 includes in each vehicle 150 associated with system 100, an on-board monitoring unit 102, which collects raw data on the operation of the vehicle, analyzes the data, provides driver warnings and communicates with a control station 130.

Control station 130 receives raw and/or analyzed data from monitoring units 102, analyzes the data and provides reports on the vehicles 150 associated with the system. Alternatively or additionally, control station 130 determines information on the roads traversed by vehicles 150 and/or general information on types of vehicles 150. Optionally, control station 130 includes a backend 132 that pushes data to monitoring units 102.

On-board monitoring unit 102 optionally includes sensors 104 for collecting information on the vehicle operation. In some embodiments of the invention, sensors 104 include accelerometers 106, optionally three accelerometers for three directions. Sensors 104 optionally also include a global positioning satellite (GPS) receiver 108, which is used for position and/or velocity information. Optionally, time information is received through GPS receiver 108. In an alternative embodiment, time information is received from vehicle 150 through an input port 110 and/or from control station 130 through transceiver 112. Further alternatively or additionally, monitoring unit 102 includes a clock.

In some embodiments of the invention, on-board monitoring unit 102 includes input ports 110, which receive operational data from mechanisms of the vehicle 150. These embodiments are optionally used when monitoring unit 102 is produced with vehicle 150 or there is otherwise an incentive to connect monitoring unit 102 to the vehicle. In other embodiments of the invention, input ports 110 are not included in monitoring unit 102 and the monitoring unit does not connect to the mechanisms of the vehicle 150, in order to collect information. Not integrating with vehicle mechanisms allows much simpler installation and allows easier marketing to vehicle owners. In still other embodiments of the invention, monitoring unit 102 connects to the mechanisms of the vehicle 150 only in minor aspects, such as to the signal light control.

On-board monitoring unit 102 optionally receives power from vehicle 150. Alternatively or additionally, monitoring unit 102 includes an internal battery which powers the elements of monitoring unit 102. In some embodiments of the invention, the internal battery is recharged by vehicle 150. Alternatively, the internal battery is replaced when its energy is drained out. Further alternatively or additionally, monitoring unit 102 includes a stand alone charging unit, such as a solar charger and/or a kinetic charger. As with the input of data, making monitoring unit 102 as a stand alone unit for power, can simplify the installation of monitoring unit 102 in vehicles.

Monitoring unit 102 further includes a transceiver 112 for communicating with control station 130. In some embodiments of the invention, transceiver 112 comprises a cellular transceiver, which communicates through public cellular networks. Alternatively or additionally, transceiver 112 uses other types of communications, such as a dedicated cellular network, WiFi, satellite communications, short wave communications and/or any other type of communications suitable for vehicles.

The communication link between transceiver 112 and control station 130 optionally includes a two-way communication link. In some embodiments of the invention, the same type of communication link is used for both transmission directions. Alternatively, a broadcast link (e.g., radio, cellular, satellite) is used for downlink transmissions to transceiver 112, while a unicast link is used for uplink transmissions from transceiver 112 to control station 130. In some embodiments of the invention, instead of a single transceiver 112, monitoring unit 102 includes a separate transmitter and a separate receiver. Alternatively to a dedicated transceiver 112 used only by system 100, a general purpose cellular telephone unit is used for at least some of the communications between monitoring unit 102 and control station 130.

Transceiver 112 is used to convey raw data and/or partially processed data to control station 130. Alternatively or additionally, transceiver 112 receives information from control station 130, for example weather information. In some embodiments of the invention, transceiver 112 is used to communicate with another vehicle 150 according to a decision of control station 130. The communications may be direct, e.g., using RF transmission, through a cellular base station and/or through control station 130 or any other switching or relay station.

Monitoring unit 102 further comprises a processor 114, which analyzes the data received through sensors 104, input ports 110 and/or transceiver 112. In some embodiments of the invention, the analysis results are used to generate driver warnings and/or to prepare data for transmission to control station 130 and/or to determine which data is to be transmitted to control station 130. Alternatively or additionally, processor 114 generates control signals that are provided directly to mechanisms of vehicle 150. In accordance with this alternative, monitoring unit 102 interfaces with controls of vehicle 150.

A data memory unit 115 is optionally used to store accumulated data for use by processor 114 and/or until it is transmitted to control station 130. Memory unit 115 is optionally used for other tasks, such as storing software run by processor 114.

Raw data (and partially or entirely processed data) is optionally transmitted to control station 130 substantially continuously, for example every few seconds or minutes. Alternatively, raw data is transmitted periodically, for example once a day or week, and/or when data memory unit 115 is full (or nearly full) or a predetermined amount of data is collected. Further alternatively or additionally, data is transmitted to control station 130 when the vehicle 150 reaches a predetermined location (for example, where communications are low cost). In some embodiments of the invention, data is transmitted to control station 130 when an accident or other extreme event occurs or otherwise when abnormal data is collected and immediate analysis by control station 130 may be useful, for example to provide driver warnings and/or to send aid. In some embodiments of the invention, data is transmitted at times determined according to the availability of cellular bandwidth and/or when low cellular rates are available. Optionally, an agreement is achieved with a cellular telephony company that the communications between control station 130 and vehicles 150 will use unused bandwidth. The cellular company optionally notifies control station 130 and/or monitoring units 102 when there is available bandwidth and the bandwidth is used by vehicles to transfer their raw data for analysis.

In some embodiments of the invention, control station 130 may send request messages to one or more vehicles 150 with requests for desired data, for example when a fleet manager is interested in data on a specific vehicle.

A mapping memory unit 116 optionally stores mapping data of roads, which may be traversed by vehicle 150. Alternatively or additionally, mapping data is received from control station 130, through transceiver 112. In some embodiments of the invention, memory unit 116 carries cached mapping data and when necessary additional mapping data is downloaded from control station 130. In some embodiments of the invention, memory unit 116 caches information of geographical areas recently traversed by vehicle 150. Alternatively, memory unit 116 caches some of the information of areas of interest, while other information, which is seldom used, is received from control station 130 upon request. Further alternatively, the mapping information in memory unit 116 is generated entirely based on the readings of GPS receiver 108, without receiving readings from other vehicles. Alternatively, a basic mapping database is installed with monitoring unit 102 and later updates are generated responsive to readings of GPS receiver 108 and/or determinations of processor 114. This alternative reduces cellular bandwidth costs.

Various methods known in the art may be used to determine which data is stored on memory unit 116. For example, each time vehicle 150 enters a new area memory unit 116 downloads the mapping data of the area, and if necessary discards the least recently used mapping data.

In some embodiments of the invention, memory unit 116 does not store a complete description of the geographical areas it describes. Optionally, memory unit 116 does not even describe details of the roads it traverses. Rather, memory unit 116 optionally stores a minimal or close to minimal amount of data on the roads, required for generating warnings and/or performing analysis by processor 114. Optionally, memory unit 116 stores coordinates of signs, junctions, road hazards (e.g., curves, holes, bumps) and/or other safety related points. A single coordinate is optionally used for traffic signs (e.g., stop and yield directives, traffic lights), entry points to a curve and speed limit signs. The speed limit is optionally determined for the vehicle each time the vehicle passes near a speed limit sign, based on the coordinate of the vehicle as compared to the coordinate of the speed limit sign in memory 116. Alternatively or additionally, when it is required to know the speed limit at a specific location, processor 114 traces back from the location to the previous point having a speed limit sign. The back tracing is optionally performed by finding a vehicle that is driving in the opposite direction from the point for which the speed limit is to be determined and tracing the vehicle to a closest speed limit sign. Alternatively, vehicles are traced from speed limit signs in the vicinity of the point to see which one leads to the point for which the speed limit is to be determined.

Alternatively or additionally, memory unit 116 stores indications of areas (e.g., represented by 4 corner coordinates) in which the road(s) have a specific attribute, such as have a known quality, bumpiness and/or speed limit. In some embodiments of the invention, memory unit 116 stores for some or all of the roads various average usage patterns, such as times of heavy traffic (e.g., rush hour), times at which there are many trucks and/or average speeds on the road. Alternatively or additionally, memory unit 116 stores for some or all of the roads, regulative information (e.g., the speed limit) and/or quality information (e.g., width of the road shoulders).

In an exemplary embodiment of the invention, memory unit 116 stores a single coordinate set for each safety related segment, such as road curves and junctions. Alternatively, some safety related segments are identified by several coordinates, such as the beginning and end point of a road curve. Optionally, memory unit 116 does not store the detailed coordinates of all the roads or even of the entire form of junctions and/or curves. Thus, mapping of large areas is achieved with a relatively small database. For example, using a disk of 10-50 Mbytes it is possible to map the roads of most of Europe. Memory unit 116 may include a flash memory, a hard disk and/or any other memory suitable for use on a vehicle.

In some embodiments of the invention, the contents of memory unit 116 are updated by processor 114 based on the raw data collected by sensors 104 and/or received through input ports 110. Alternatively or additionally, the contents of memory unit 116 are updated responsive to commands from control station 130. The commands from control station 130 are optionally generated based on data collected from a plurality of vehicles 150, as described below.

Monitoring unit 102 optionally includes an output unit 118 which provides warnings to the driver. Output unit 118 may provide audible warnings, visual warnings and/or tactile warnings. Visual warnings may be provided using various display units (e.g., LED, LCD, TFT, seven segment LEDs) and may include short text on the type of the warning or may include a color and/or symbol coding.

Alternatively or additionally, a general warning is provided, optionally with a severity indication. Optionally, if the driver so desires, he/she may request details of the warning.

In some embodiments of the invention, output unit 118 provides warnings which are sensed only by the driver and are not noticeable by other people in the vehicle, in order not to worry the other people in the vehicle and/or to respect the driver's privacy. Optionally, output unit 118 comprises a vibrating unit which rotates against the driver in order to warn the driver. For example, the rotating unit may be positioned on the driver's seat belt, on the steering wheel and/or on the driver's seat. Alternatively or additionally, output unit 118 comprises an earphone which provides audible warnings directly to the driver's ear. In some embodiments of the invention, output unit 118 includes a display which only the driver can see, for example a display located on the lower part of the steering wheel. Another example relates to a display which can only be read from a specific angle, such as specific LED displays known in the art. Alternatively or additionally, the display has a frame and/or shutters that prevent side viewing. In some embodiments of the invention, the display may be mounted on a wrist of the driver. Possibly, the display is wirelessly coupled to the body of monitoring unit 102.

Optionally, monitoring unit 102 includes a user interface 120, through which the driver and/or owner of vehicle 150 configure the operation of monitoring unit 102. In an exemplary embodiment of the invention, the driver may select whether warnings are provided discretely (i.e., only to the driver) or publicly. Alternatively or additionally, monitoring unit 102 determines automatically whether to display the warnings discretely, according to whether there are additional passengers in vehicle 150.

User interface 120 optionally includes buttons, knobs and/or a touch screen. Alternatively or additionally, user interface 120 includes a microphone and voice recognition circuitry. Further alternatively or additionally, any other user input apparatus may be used, including a remote control interface.

In some embodiments of the invention, the direction from which the warnings are presented to the driver is indicative of the direction of the safety hazard. For example, when a danger point is on the right, a warning may be provided from a right side speaker and/or a right side flashing light.

Output unit 118 is optionally part of monitoring unit 102 and is solely for providing warnings. Alternatively or additionally, the speakers of vehicle 150 and/or other mechanisms of vehicle 150 are used to provide warnings to the driver.

In some embodiments of the invention, output unit 118 includes a heads up display (HUD), which is implemented by projecting warnings on the windshield of vehicle 150. The HUD is optionally based on reflection of displayed messages from the windshield. Optionally, the attributes of the display on the windshield are automatically adapted according to the lighting conditions on the windshield, for example as measured by dedicated light sensors positioned on the windshield or in its vicinity. Optionally, the sensors have a wide angle for determining the general lighting conditions. Alternatively or additionally, the sensors have a narrow angle directed in the direction of light that would interfere with the HUD display. Thus, the warnings on the windshield are perceivable by the driver regardless of the light conditions. Optionally, the windshield is not modified for the display and no special screen surface is placed on the windshield to provide better reflection. Rather, the adapting of the display angle, the wavelength, the color and/or the intensity to the light conditions operates to allow driver identification of the warnings.

Alternatively or additionally to displaying a warning, means are used to highlight a safety hazard or a traffic sign itself. For example, a projector (or the car headlights) may be automatically operated to illuminate an important traffic sign or safety hazard. In some embodiments of the invention, a position on the windshield in the direction of the sign, hazard or an approaching vehicle is illuminated to call the attention of the driver to that direction. The position of the hazard or traffic sign is optionally determined from memory unit 116 and/or from a radar mounted on vehicle 150, in accordance with an exemplary embodiment of the invention.

Referring in more detail to sensors 104, in some embodiments of the invention, the sensors 104 of monitoring unit 102 are relatively cheap so that the total cost of monitoring unit 102 is relatively low. In some embodiments of the invention, monitoring unit 102 does not include radars or cameras which are relatively expensive. Alternatively or additionally, GPS receiver 108 is relatively cheap and does not perform differential correction in order to provide high accuracy location data. Instead, the data from accelerometers 106 are used to provide sufficiently corrected location information, when necessary.

In other embodiments of the invention, high cost sensors are used to enhance the abilities of monitoring unit 102, for example to provide real time weather information from weather sensors, to provide accurate distance information from vehicles in front of the monitored vehicle and/or to identify obstacles using a camera. A detailed discussion of exemplary sensors that may be used for gathering different pieces of information is brought herein below.

Optionally, accelerometers 106 include an accelerometer which measures lateral forces on vehicle 150, an accelerometer which measures longitudinal forces on vehicle 150 and an accelerometer which measures elevation forces on vehicle 150. Alternatively or additionally, an angular and/or rotational accelerometer is used. In some embodiments of the invention, accelerometers 106 are not required to have a high accuracy, but rather provide sufficient information for determining when substantial forces are applied to the vehicle. Accelerometers 106 optionally have an accuracy of at least 0.1 g or even 0.05 g with a sampling rate of at least 10-20 samples per second. The accelerometer may include substantially any sensor used to sense acceleration, including, for example, mechanical and capacitive sensors and inertia based sensors (e.g., mechanical based, laser based).

The sampling rate of accelerometers 106 is optionally sufficiently fast to allow determination of the braking patterns of vehicle 150. The sampling rate is adapted, in some embodiments of the invention, according to the road conditions and/or the driver behavior. Optionally, when approaching an intersection and/or a curve, the sampling rate is increased, and after the intersection or curve the sampling rate is decreased. Alternatively or additionally, the sampling rate is adjusted according to the speed of the vehicle 150. Further alternatively or additionally, the sampling rate is adjusted according to the driving pattern of vehicle 150. For example, when it is determined that the driver is driving relatively daringly, a higher sampling rate is used. In some embodiments of the invention, monitoring unit 102 includes sensors that are only operated at special occasions, such as when an accident is possible and/or near intersections or for specific drivers (e.g., new drivers). This may allow lower power consumption and less wear and tear of monitoring unit 102.

In some embodiments of the invention, the sampling rate is adjusted according to the difference between consecutive samples collected. Optionally, processor 114 reviews the collected samples and discards consecutive samples having very close values and/or compresses the samples using a run compression method. In some embodiments of the invention, when consecutive samples have very close values, the sampling rate is reduced. When consecutive values have substantially different values, the sampling rate is increased.

The samplings from all of accelerometers 106 are optionally collected at the same rate, for simplicity. Alternatively, different sampling rates are used for the different accelerometers 106, according to the values collected and/or the road conditions.

GPS receiver 108 optionally has a sampling rate of about one sample each second, as is common in the art. In some embodiments of the invention, the sampling rate of GPS receiver 108 and/or of any of the sensors described below is adjusted dynamically according to any of the methods described above for accelerometers 106.

In some embodiments of the invention, the use of user interface 120 is restricted to authorized persons (e.g., the owner of the vehicle, the permanent driver) using any access methods known in the art, such as electronic tokens, smart cards, password keys and/or biometric identification (e.g., voice verification, finger prints). Optionally, each driver entering vehicle 150 is required to identify before user interface 120. Accordingly, system 100 records the collected data on the driver instead of, or in addition to, recording the data for the vehicle. Optionally, if the driver does not identify an alarm is sounded and/or the vehicle is prevented from operating. Alternatively, an omnibus driver is defined for the vehicle. Further alternatively or additionally, monitoring unit 102 attempts to guess the identity of the driver according to the driver profiles of the different drivers of the vehicle and the profile of the driver of the current driving session.

Backend 132 optionally provides data to monitoring units 102 in response to requests from monitoring units 102. Alternatively or additionally, backend 132 provides updates in broadcasts to all vehicles 150 and/or in multicasts to all vehicles 150 in a region. Multicast data may be provided only to monitoring units of a specific model and/or to vehicles having a specific service level agreement requiring the data. In some embodiments of the invention, the data is multicast to vehicles according to their types, such that trucks receive different updates than private cars.

The broadcasts are optionally provided periodically, when updated data is available and/or upon instructions from a system operator. For example, updates are optionally provided every hour and/or every time weather updates are received.

Figure 2:
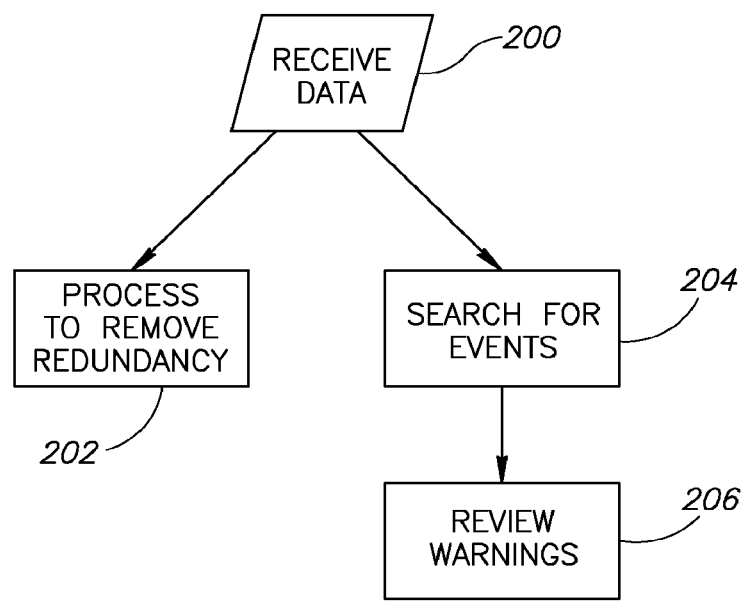
FIG. 2 is a flowchart of acts performed by an on-board monitoring unit of a vehicle, in accordance with an exemplary embodiment of the invention.

FIG. 2 is a flowchart of acts performed by processor 114, in accordance with an exemplary embodiment of the invention. Processor 114 receives (200) data from sensors 104 and/or input ports 110. The data is processed (202) in order to remove unnecessary data and/or in order to compress the data for transmission to control station 130. Optionally, in parallel to the processing (202) for transmission, the data is searched (204) for events that require warnings. The search is optionally also based on data received from control station 130, such as a weather forecast, and/or geographical data from memory 116. The warnings found in the search are reviewed (206) to determine which warnings are to be provided to the driver and/or how they are to be provided to the driver.

Referring in more detail to processing (202) data for transmission, in some embodiments of the invention, consecutive measurements of similar values are discarded. Alternatively or additionally, low values and/or values having a low accuracy are discarded. In some embodiments of the invention, in the vicinity of intersections, curves and/or other points of interest data is not discarded and/or lossless or near-lossless compression methods are used.

Alternatively or additionally, only changes in velocity and/or acceleration information are recorded, while all other samples are discarded. Optionally, when the azimuth of the vehicle does not change, the location information is not transmitted as it may be reconstructed from the velocity.

In some embodiments of the invention, accelerometer values beneath about 5 dB are discarded, except for possibly being used for receiving a general indication on the smoothness of the road (e.g., to determine whether the vehicle is on a road or dirt path). Alternatively or additionally, acceleration values that do not affect the speed of the vehicle are discarded. In some embodiments of the invention, control station 130 filters out acceleration values that occur in the same location for nearly all vehicles, when the reason for the acceleration is assumed to be due to road bumpiness. The acceleration itself is optionally used in determining the bumpiness of the road segment.

Referring in more detail to searching (204) for events, in some embodiments of the invention, the searching for events includes identifying when the vehicle 150 is approaching a sign (e.g., a stop sign), a curve or an intersection. The speed of the vehicle 150 and/or other operation attributes of the vehicle are determined and are compared to thresholds indicating when a warning is required. Optionally, the threshold is set dynamically according to the time of day (e.g., light or dark, rush hour), date, the weather, visibility and/or a driver or vehicle rating or profile. For example, a driver that generally completes curves entered at high speed without leaving the lane may have a higher threshold than a driver that is known to vigorously press on the brakes within curves. In some embodiments of the invention, the driver and/or vehicle owner may set a desired threshold, for example through user interface 120. In some embodiments of the invention, the warning thresholds are adjusted responsive to the number of passengers in vehicle 150. The number of passengers may be determined according to sensors under the passenger seats, from driver input, based on acceleration readings and/or using any other method known in the art.

In some embodiments of the invention, each mapped curve, intersection or other safety related point is associated with a severity rating which is used in adjusting the threshold. Optionally, the severity rating is configured into a mapping database by a human operator. Alternatively or additionally, automatic map analysis is used to assign the severity ratings, for example according to the curve angle and/or length. Further alternatively or additionally, the severity rating is assigned according to a driver or vehicle profile based on data collected from vehicles 150, for example, as described below with reference to act 312 of FIG. 3.

Alternatively or additionally to identifying events by reviewing points of interest that vehicle 150 is approaching, monitoring unit 102 determines times at which the speed of vehicle 150 is high and then determines whether this speed will be problematic in the upcoming road segment.

Further alternatively or additionally, monitoring unit 102 determines is a warning is required, when abrupt changes in speed and/or acceleration are identified.

In some embodiments of the invention, warnings are provided when vehicle 150 passes the speed limit by a predetermined amount (which may be negative if desired) and/or when vehicle 150 exceeds the prevailing speed on the road segment.

When approaching a stop sign (or yield sign), for example, monitoring unit 102 optionally determines whether vehicle 102 will be able to stop on time. In some embodiments of the invention, the distance to the stop sign is determined based on the location of the sign as compared to the location of vehicle 150. Optionally, when control station 130 is aware of vehicles standing at the stop sign, the information is transmitted to monitoring unit 102, which accordingly reduces the distance in which vehicle 150 needs to stop. The awareness of standing vehicles may be based, for example, on GPS readings from vehicles associated with system 100, may be based on camera or radar readings from vehicle 150 and/or may be based on camera or radar readings from a stationary camera or radar in the vicinity of the stop sign, which is part of system 100 or is used also for other purposes. In some embodiments of the invention, statistical information is collected on vehicles that actually succeeded to stop or did not succeed to stop and accordingly the point at which a warning is required is determined.

Optionally, warnings are generated when a driver enters a curved at an inappropriate speed for the curve.

In some embodiments of the invention, warnings are provided on obstacles on the road or on vehicles, pedestrians or animals which may enter the road abruptly. Any of the above methods suggested for vehicles waiting at stop signs may be used to identify the obstacles. Warnings may be provided for all obstacles or may be provided when the speed of the vehicle, if continued, may not allow the driver to stop on time. In some embodiments of the invention, when a particular vehicle is known to drive carelessly and/or may soon enter the drivers lane, monitoring unit 102 provides the driver with a description of the vehicle, so that the driver can avoid getting close to that vehicle.

Pedestrians may carry a small warning unit that indicates their location to control station 130 or to passing vehicles. The small warning unit may include, for example, RF or satellite transmitter, a passive transceiver in accordance with any position determination method known in the art. Such warning units are especially advantageous to handicapped and elderly pedestrians. When the warning unit is identified on a road (not on the sidewalk), the vehicles in the vicinity are warned of the pedestrian in the road.

In some embodiments of the invention, at crosswalks, pedestrians may press a button on a pole at the intersection, which notifies control station 130 and hence vehicles 150 in the vicinity of the fact that a pedestrian wants to cross the street.

In an exemplary embodiment of the invention, warnings are provided when passing near a junction where other vehicles are turning right onto the lane of the vehicle 150, where there is no entrance lane for building up speed. These warnings may be provided when it is known that there are vehicles waiting to come out or, for simplicity of system 100, regardless of whether there are vehicles waiting to enter the lane.

Optionally, warnings are provided on bumps and/or holes in the road. The warnings may be provided regardless of the vehicle speed or may be provided only when vehicle 150 is advancing at a speed that is not compatible with the bumps or holes. Similarly, warnings are optionally provided upon approaching a school zone and/or a steep road.

In some embodiments of the invention, warnings are provided when a vehicle passes a non-entry sign in the wrong direction or attempts to perform a U-turn on a one way street.

In some embodiments of the invention, control station 130 has information on the time tables of trains, so as to provide warnings to vehicles 150 approaching train crossings at times a train is expected to pass. Optionally, the information on the train time tables is updated by live updates from a train monitoring unit and/or based on other information external to vehicle 150. Optionally, a vehicle standing at a train crossing is provided with information, for example a count down, on when the train crossing will reopen and/or the number of trains and/or train cars that are planned to pass the crossing. Train warnings are especially important in areas where there are no warning lights or gates.

Referring in more detail to reviewing (206) the warnings, in some embodiments of the invention, at any time only a single warning is displayed in order not to flood the driver with warnings. Alternatively or additionally, except for high priority warnings of imminent accidents, up to a maximal number of warnings are allowed to be displayed during a predetermined amount of time (e.g., 15 minutes) or during a driving session.

The warnings generated are optionally evaluated so as to give each warning a probability that it will prevent an accident or any other severe results. Optionally, when two warnings are generated substantially together, the warning with the higher score is displayed. The score may depend, for example, on weather conditions or lighting conditions. It is noted that dim lighting is in some cases more severe with regard to obstacles than curves, such that if one of a curve warning and an obstacle warning needs to be chosen, the selection may be different during day hours than during the night.

In some embodiments of the invention, the warning scores depend or the driver profile. For example, a driver may be known to have problems with taking curves at high speeds, while being known to stop meticulously at stop signs.

The driver profile optionally includes a long term portion and a short term portion that relates to acts of the current session. For example, when a driver may have a rush profile and a leisure profile and monitoring unit 102 determines which of the profiles is applicable in each driving session.

In some embodiments of the invention, warnings are provided without relation to events (e.g., a correlation between vehicle speed and the road). For example, each time vehicle 150 approaches a sign, the sign is displayed by monitoring unit 102, within the vehicle. Optionally, the distance from the sign or road hazard at which the sign is displayed by output unit 118 is adjusted according to the driver profile of the driver of vehicle 150.

Output unit 118 optionally displays information on the road segment on which vehicle 150 is currently driving, for example the speed limit, the average vehicle speed and/or warnings on construction.

Alternatively or additionally, monitoring unit 102 is provided with timing information of traffic lights that vehicle 150 is approaching. In some embodiments of the invention, output unit 118 provides an indication of the distance to the traffic light together with an indication of the time slot at which the light will be green, a speed at which to approach the light in order to reach the light when it is green and/or a count down until the light becomes green. Optionally, when vehicle 150 stands at a light, a count down is displayed on the time until the light turns green. Alternatively or additionally, a buzzer operates 3-4 seconds before the light turns green. In some embodiments of the invention, the driver may select a desired display format from a plurality of possibilities.

In some embodiments of the invention, data on warnings determined by monitoring unit 102 is transmitted to control station 130 for immediate dissemination to other drivers on the same road. For example, when an accident is determined to occur with high probability, other vehicles 150 are alerted to slow down or stop so as not to join into a chain accident. The vehicle involved in the accident has much to gain from not having additional vehicles involved in the accident.

In some embodiments of the invention, in addition to providing warnings, monitoring unit may perform actual control of vehicle 150, for example when an accident is imminent and/or when there is suspicion that the driver is asleep. Optionally, a warning is first displayed, and only after a predetermined time, does monitoring unit 102 perform vehicle control acts (e.g., braking).

Alternatively or additionally, to controlling vehicle 150 when a dangerous situation is anticipated, safety measures are taken, so as to protect the passengers, such as tightening seat belts, doubling braking system power and/or cocking the airbag system. Once the danger is removed, the measures taken are optionally cancelled.

Figure 3:
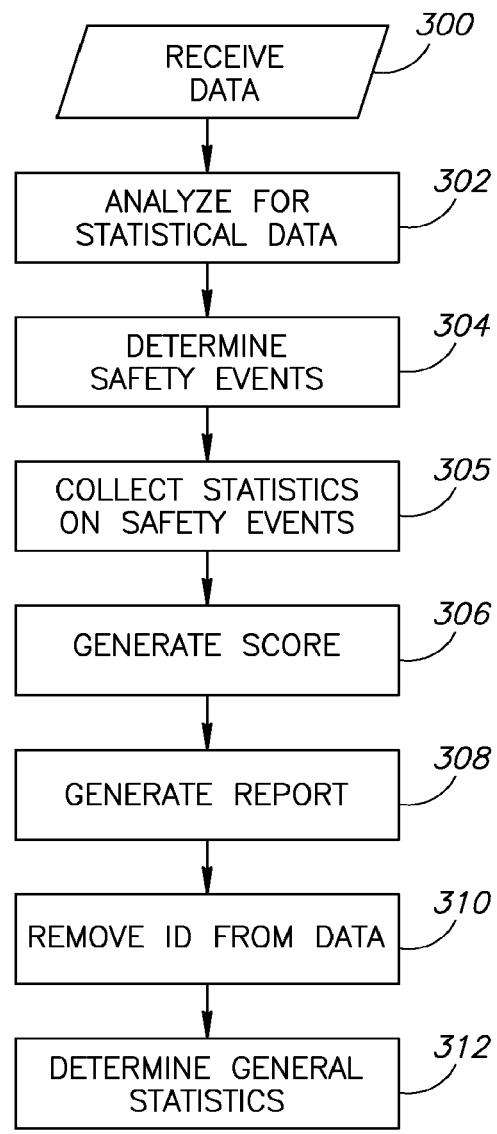
FIG. 3 is a flowchart of acts performed by a control station, in accordance with an exemplary embodiment of the invention.

FIG. 3 is a flowchart of acts performed by control station 130, in accordance with an exemplary embodiment of the invention. For each monitored vehicle 150, control station 130 receives (300) the accumulated data transmitted from its monitoring unit 102. The data of the monitored vehicle (150) is optionally analyzed to collect (302) statistical data on the driving of vehicle 150. In addition, the received data is analyzed to determine (304) safety violation events of vehicle 150. Statistics are optionally collected (305) on the safety violation events of the vehicle 150. A score for the vehicle is generated (306) or updated based on the collected statistical data and/or the determined events. Alternatively or additionally, a report on the behavior of the driver of vehicle 150 is generated (308).

The identity of the vehicle 150 to which the data relates is optionally removed (310), for privacy purposes, and the data is analyzed to determine (312) statistics for the type of the vehicle to which the data relates and/or for road locations traversed by vehicle 150. The determination (312) of statistics may be performed, for example, from scratch based on the raw data from vehicles 150 and/or using data from the determination (304) of safety violation events performed for the particular vehicle 150.

Referring in more detail to collecting (302) statistical data, in some embodiments of the invention, the received data is analyzed to determine for each driven road segment, a class to which the segment belongs. Optionally, segments are defined for each predetermined time unit (e.g., a minute) or distance unit (e.g., a kilometer). Alternatively or additionally, segments are determine where the sensor readings have similar values. In some embodiments of the invention, when the value of a classifying parameter changes within a segment, the parameter value most common in the segment is used for the entire segment. Alternatively, an average value of the parameter is used to classify the segment. Further alternatively, when the value of a classifying parameter changes, a new segment is defined.

The class optionally relates to the type of road traversed and/or the time of day or type of day (work day, holiday, week end) at which the segment was traversed.

Different classes are optionally defined for roads of different widths, different average traffic loads and/or of different actual loads as discussed below. Alternatively or additionally, different classes are defined for roads having different safety ratings and/or safety attributes (e.g., types of safety fences between opposite direction traffic). Further alternatively or additionally, different classes are defined for roads of different smoothness (e.g., based on readings of the accelerometers) and/or according to the area in which the roads pass (city, rural, highway not near pedestrians). In some embodiments of the invention, different road classes are defined according to the familiarity of the road to the vehicle, as determined for the driving history of the vehicle.

In some embodiments of the invention, at least 4, 6 or even 10 classes are defined. The use of a large number of classes provides more particular information on the actual usage of the vehicle and prevents averaging out of important data. In some embodiments of the invention, more than 20 or even 50 different classes are defined. In some embodiments of the invention, inn order to reduce the memory and processing resources required, fewer than 20 or even fewer than 10 classes are defined.

In some embodiments of the invention, for example, different classes are defined for different lighting conditions (e.g., day, night with street lights, night without street lights). Alternatively or additionally, different classes are defined for each hour of the day and/or for each group of hours (e.g., morning, noon, afternoon, evening, night). Further alternatively or additionally, different classes are defined according to whether the segment was traversed during rush hour of the specific road or in general. In some embodiments of the invention, different classes are defined for segments traversed while driving in conditions in which the sun is in the eyes of the driver.

Different classes are optionally defined for different drivers of the vehicle 150. Alternatively or additionally, different classes are defined for different weather conditions.

In some embodiments of the invention, classes are predefined or preconfigured. Alternatively or additionally, classes are defined on the fly according to the sensor values.

In some embodiments of the invention, when necessary to conserve storage space, a predetermined number of classes are allowed. Optionally, when a new class needs to be defined and the limit of the number of classes was reached, two or more classes having similar values for the measured attributes, are combined. In some embodiments of the invention, when two or more classes are determined to have similar values the classes are combined regardless of the number of classes defined.

Based on the classification, statistics of the driving of vehicle 150 are determined for each class and/or for the total of all classes of the vehicle 150.

For each segment, control station 130 optionally determines driving attributes of the segment, such as the driving distance along the segment (i.e., the length of the segment), the driving time duration of the segment and/or the average driving speed along the segment.

Alternatively or additionally to determining the absolute average speed, the average difference between the driving speed and the speed limit and/or the prevailing speed, is determined. Further alternatively or additionally, the possible speeds are divided into bins, e.g., 50-60, 60-70, 70-80 km/h, and a speed profile is determined based on the time in each speed bin. In some embodiments of the invention, the speed profile is determined only for speeds above the speed limit and/or above the prevailing speed, i.e., leaving all speeds below the speed limit in a single bin. In some embodiments of the invention, the minimal and maximal speeds are registered.

In addition to collecting parameters for road segments, statistical parameters are optionally collected for intersections. As with road segments, the data for intersections is optionally sorted according to different classes.

The intersection parameters optionally include the number of intersections passed, the directions turned in each intersection, In some embodiments of the invention, the intersection parameters include the speed at which the intersection was passed, optionally differentiating according to the direction in which the intersection was traversed. The parameters optionally indicate the distance or time from the intersection at which the speed of the vehicle begins to decrease and/or the distance or time from the intersection at which the vehicle begins to decelerate. In some embodiments of the invention, a deceleration profile is determined for each intersection. The deceleration profile may be stored as is and/or in an alternative embodiment a set of possible deceleration profiles may be pre-defined and for at least some intersections the closest deceleration profile is determined. Optionally, extreme cases are stored separately.

Statistical parameter values are optionally also collected for each road curve passed and/or for each sign passed. In an exemplary embodiment of the invention, for each road curve, the speed of entering the curve and the speed of exiting the curve are determined.

In addition, other statistical parameters may be determined, for example one or more of: the actual roads traveled by the vehicle, the average driving time and/or distance per day and/or per session, the number of separate driving sessions (separate sessions are optionally defined as session separated by a predetermined amount of time, such as at least 10-30 minutes) and/or the number of intersections passed in a session. Other parameters for which data is collected, may include, for example, the number of driving sessions for a predetermined distance (e.g., 1000 miles). Other statistical parameters may be collected, according to the accumulated data.

Referring in more detail to determining (304) safety violation events, in some embodiments of the invention, for each instruction sign, it is determined whether the sign was obeyed and optionally the extent to which the sign was obeyed. For example, for each warning sign, the speed reduction of the vehicle is determined. Cases in which there was no deceleration or the vehicle was even accelerated, are optionally noted as safety violation events. Alternatively or additionally, cases in which drivers disobey instruction signs, such as no entrance, no U-turn or no left turn are noted.

Optionally, for each stop sign, it is determined whether vehicle 150 came to a full stop, came to a nearly full stop, slowed down a little or did not slow down at all. In some embodiments of the invention, the location at which the vehicle stopped is determined, for example whether the vehicle stopped at a designated stop line or stopped inside the intersection, probably relatively late after noticing a passing vehicle. In some embodiments of the invention, when the driver turned in the intersection, the slowing down for the turn is related to in assigning a score to the acts of the vehicle with respect to the stop sign.

For yield signs, control station 130 optionally determines whether vehicle 150 slowed down significantly. Alternatively or additionally, when there is information from other vehicles in the vicinity, it is determined whether the vehicle 150 gave the right of way to the other vehicles. The information from other vehicles may be based, for example, on cameras or radars stationary or mounted on vehicle 150, and/or on position readings from monitoring units 102 mounted on the other vehicles.

In some embodiments of the invention, extreme accelerations are reviewed by control station 130 to determine whether there was a safety violation, such as racing or otherwise reckless vehicle handling.

In some embodiments of the invention, extreme decelerations are reviewed to determine why there was a need to press the brakes so abruptly.

Optionally, when the vehicle 150 makes a U-turn, the safety of the U-turn is determined by examining the location at which the U-turn was taken, whether other cars were in the vicinity of the U-turn and/or the speed of the vehicle during the U-turn.

Abrupt lane changes are optionally determined and registered. The lane changes are optionally identified as relatively strong or abrupt lateral deceleration when vehicle 150 is moving at a relatively high speed. Alternatively or additionally, cases in which vehicle 150 falls off the road and/or drives on the road shoulders, are determined.

For each case of moving between lanes and/or of turning at intersections, control station 130 optionally determines whether the signaling light was operated. Information on the signaling light is determined by connecting to the vehicle mechanisms and/or by operating a microphone which collects the sounds within the vehicle and signal processing that identifies signaling light sounds. A vehicle report may indicate, for example, the average number of times the signaling lights are used over a mile and/or the number of turns or lane changes in which the signaling was not used. Alternatively or additionally, the distance before the lane change or turn at which the signaling was operated is determined. In some embodiments of the invention, occasions when the signaling was used without any following turn are determined.

Other safety related events relating to intersections may include passing through an intersection at a speed above a predetermined threshold, changing lanes within an intersection and/or braking within an intersection. In some embodiments of the invention, cases in which the vehicle stops within an intersection, for example due to entering a non-empty intersection are also determined.

In some embodiments of the invention, for each curve, control station 130 determines whether the vehicle enters at too high a speed, whether the vehicle did not keep its lane and/or whether the vehicle braked abruptly.

Reverse driving is optionally determined and analyzed. Cases in which vehicle 150 drives in reverse on a highway, drives in reverse for more than a predetermined distance and/or drives backwards at a speed above a predetermined threshold, are registered as traffic violations. Reverse driving is optionally determined according to the position readings of the vehicle.

It is noted that shaking measurements of the accelerometers on a smooth road may be indicative of improper maintenance of vehicle 150 and/or improper driving habits.

Use of the headlights is optionally monitored so as to determine when the driver uses the headlights (e.g., always, only at night, during the winter). Alternatively or additionally, seat belt use is monitored to determine how often the driver fails to use the seat belt.

Following is a list of additional parameters, one or more of which are optionally monitored:

1. Braking
   1.1. Number of decelerations of over one or more predefined acceleration values
   1.2. Highest deceleration level
   1.3. Frequency of extreme decelerations
   1.4. Average deceleration level
   1.5. Number of extreme decelerations at high speed (highway)
   1.6. Number of extreme decelerations at slow speed (bumper to bumper)
   1.7. Number of extreme decelerations at rush hours
   1.8. Average/highest acceleration level
2. Road Signs Adherence
   2.1. Stop Signs
      2.1.1. Number/percentage of failures to stop at stop signs (not necessarily full stop)
      2.1.2. Number/percentage of failures to reach full stop at stop signs
      2.1.3. Average minimal velocity at stop signs (0=full stop always=very safe)
      2.1.4. Average/highest velocity on approach to stop signs
      2.1.5. Average/highest frontal deceleration on approach to stop signs (attention to signs)
      2.1.6. Average time/distance for deceleration on approach to stop signs
   2.2. Yield Signs
      2.2.1. Number/percentage of failures to decelerate on approach to yield sign
      2.2.2. Number/percentage of failures to decelerate to designated speed at yield signs
      2.2.3. Average/highest excessive deviation from the designated speed at yield signs
      2.2.4. Average/highest velocity on approach to yield signs
      2.2.5. Average/highest frontal deceleration on approach to yield signs
      2.2.6. Average time/distance for deceleration on approach to yield signs
   2.3. U-Turns
      2.3.1. Number/frequency of turning at no-u-turn locations
   2.4. One Way
      2.4.1. Number/frequency of entering a one way road on the opposite direction
   2.5. Traffic Lights
      2.5.1. Number/percentage of failures to stop at red traffic lights
      2.5.2. Average/highest velocity on approach to red traffic lights
      2.5.3. Average/highest frontal deceleration on approach to red traffic lights
      2.5.4. Average time/distance for deceleration on approach to red traffic lights
      2.5.5. Number/percentage of failures to stop at yellow traffic lights
      2.5.6. Average/highest frontal acceleration on approach to green traffic lights
      2.5.7. Number/percentage of failures to slow on crossing at green traffic lights
3. Road Safety Adherence
   3.1. Curves
      3.1.1. Average/highest lateral deceleration (side force) at curves
      3.1.2. Average/highest velocity on approach to curves
      3.1.3. Average/highest excessive deviation from designated speed at curves
      3.1.4. Average/highest frontal deceleration on approach to curves (attention to curve sign)
      3.1.5. Average time/distance for deceleration on approach to curves
   3.2. Tailgating/Safe Distance Keeping
      3.2.1. Number/percentage of tailgating events (also with relation to specific types of roads)
      3.2.2. Average/highest frontal deceleration at events associated with tailgating
      3.2.3. Average/highest velocity at events associated with tailgating
      3.2.4. Average time/distance for deceleration on approach to curves
      3.2.5. Severity of tailgating events (determined according to velocity, decelerations and locations)
   3.3. Lane Changes
      3.3.1. Number/frequency of extreme steering maneuvers (lateral deceleration indication)
      3.3.2. Number/frequency of extreme steering maneuvers with relation to velocity and location (especially in highways)
      3.3.3. Average/highest velocity in lane change events
      3.3.4. Severity of lane change events (according to velocity and lateral deceleration)
   3.4. Overtaking
      3.4.1. Number/frequency of extreme steering maneuvers on narrow roads (one lane per path)
      3.4.2. Number/frequency of extreme steering maneuvers on roads with no overtaking
      3.4.3. Average/highest velocity in overtaking events
      3.4.4. Severity of overtaking events (according to velocity, location and lateral deceleration)

In some embodiments of the invention, a report generated for vehicle 150 relates to at least five different safety issues, such as speed, signs, overtaking, reverse driving, taking curves and passing intersections. The use of a sufficient number of different safety issues allows more accurate profiling and hence allows giving larger reductions for insurance policies, for example. In some embodiments of the invention, at least ten different safety issues are related to. Optionally, data is collected for over 20 or even 40 different parameters of the different safety issues.

In some embodiments of the invention, each occasion in which vehicle 150 decelerates at above a predetermined rate is analyzed to determine the cause of the deceleration. The analysis optionally determines where the deceleration occurred and what the driver did afterwards (e.g., parked, continued driving). Alternatively or additionally, patterns of deceleration are determined. For example, many braking occasions occurring within a short period on a highway, at relatively low speed, are indicative of a traffic jam and are related to accordingly. Optionally, the braking and accelerating patterns are determined to suggest more economical behavior to the driver, if applicable. In some embodiments of the invention, sporadic strong brakings are assumed to be due to the vehicle not keeping a safe distance from the vehicle in front of it. Braking performed near an intersection and/or braking followed by parking maneuvers are assumed to be related to normal driving practice. In some embodiments of the invention, braking occasions that cannot be attributed to other reasons are assumed to be due to not keeping safe distance from other vehicles. The number of such braking occasions is counted and accordingly a distance keeping score is assigned. Optionally, the severity of the counted braking occasions is taken into account in assigning the distance keeping score.

Braking occasions may also be indicative of near-accidents. Alternatively or additionally, cases in which abrupt steering maneuvers are identified together with sudden brakings are assumed to be indicative of near accidents or of accidents. Identification of accidents and near accidents may be useful for fleet managers and to insurers to receive information on accidents or near accidents not reported due to their low damage or there not being any damage.

Overtaking occasions are optionally identified and analyzed. Overtakings are optionally identified by changing of lanes. When there is information on the vehicle passed by the overtaking vehicle, the overtaking is optionally analyzed to determine that the overtaking vehicle did not return to the original lane too early or too late (i.e., remaining in the left lane for too long). In some embodiments of the invention, the number of overtakings performed is estimated based on identification of acceleration with lane changing. Optionally, road segments where overtaking is forbidden are marked in memory unit 116. Note is taken of overtakings performed in these road segments in determining the driver score.

In some embodiments of the invention, cases in which too many lane changes are performed within a short period are determined.

Alternatively or additionally, to determining safety violation events, vehicle handling events are determined, such as braking immediately before and/or after accelerating, even if these events do not relate to specific safety violations. In some embodiments of the invention, the distance of slowing down before intersections and/or curves is determined in order to reduce wasteful brake usage.

Further alternatively or additionally, information is collected on the locations at which vehicle 150 stands. Optionally, note is taken of cases in which vehicle 150 stops on the shoulder of a highway, possibly taking note of the distance from the lanes of the highway. In some embodiments of the invention, note is taken of parking in dangerous locations, such as within intersections and/or in bus stations. Optionally, the time for which the vehicle stops at these locations is registered.

In some embodiments of the invention, note is taken of the locations at which the vehicle is parked, for theft analysis purposes. For example, note may be taken of parking in locations from which vehicles are stolen at relatively high percentages. Driving activity in unusual hours for the vehicle is optionally used to detect vehicle theft. In some embodiments of the invention, when the driver profile of the driver is different from the usual profile, a warning is transmitted to the vehicle owner of a possible vehicle theft.

In some embodiments of the invention, monitoring unit 102 includes dedicated sensors for additional safety related issues, such as use of seat belts and/or operation of lights and signals. In these embodiments, cases in which the lights were not properly used and/or the seat belts were not properly used, are determined. Other dedicated sensors may relate to the alertness of the driver, for example measuring intoxication, fatigue, nervousness and/or attention. The sensors may include, for example, a camera based physical appearance analyzer, which acquires one or more images of the driver and accordingly determines driver alertness. Alternatively or additionally, a breath tester for intoxication is employed.

Driver alertness is determined, in some embodiments of the invention, based on analysis of the driver behavior, for example based on the frequency and/or intensity of moving the steering wheel and the acceleration changes resulting therefrom. The acceleration changes may be compared to general public statistics or to statistics of the same driver, in identifying non-alertness. Fatigue may also be determined based on a comparison of the current driving behavior (e.g., average speed, number of lane changes) to the driver's profile.

Referring in more detail to generating (306) a score for the vehicle, in some embodiments of the invention, the score compares the behavior of the driver of the vehicle to the behavior of other drivers. Optionally, a relative score is provided indicating a safety percentile to which the driver belongs, relative to other drivers. Alternatively or additionally, an absolute safety score is provided based on a predetermined set of attributes. Further alternatively or additionally, an advancement score is provided, which indicates the current safety behavior of the driver relative to previous behavior of the driver.

It is noted that comparison of the driver to other drivers may be performed at earlier stages than generating (306) the score. For example, some of the accumulated safety related data may be compared to dynamic thresholds generated responsive to the average behavior of drivers. As mentioned above, in an exemplary embodiment of the invention, speeding of the driver is determined relative to the average speed of drivers in same or similar time and road classes.

Referring in more detail to generating (308) a report, in some embodiments of the invention, the report is generated with tips for driving more safely. Alternatively or additionally, the report includes recommendations for minimizing vehicle wear and tear and/or gasoline usage. The report may be provided to the driver, to a fleet manager or to a vehicle owner.

In some embodiments of the invention, the report is provided periodically, for example by mail. Alternatively, important issues, such as reckless driving, are reported immediately. For example, when severe safety transgressions are performed, control station 130 may send an immediate notification to the parents or fleet manager, for example using SMS messages, pager massages, e-mail or pre-recorded telephone notices.

In some embodiments of the invention, the report includes indication of the number and/or type of safety transgressions performed. Alternatively or additionally, the report states the percentage of times that safety transgressions were performed, such as the percentage of turns in which signaling lights were not used and/or the percentage of stop signs at which a full stop was not performed.

Optionally, the report includes indication of how the driver reacts to specific conditions and challenges, such as rain or snow. The report optionally indicates whether the driver is more careful under harsh conditions, such as rain, snow and/or darkness. The carefulness optionally includes slower driving, performing fewer overtakings and/or beginning to brake earlier when approaching an intersection or curve.

In some embodiments of the invention, the generated (306) score is used in determining insurance rates paid for vehicle 150. Optionally, vehicle owners willing (or required) to install monitoring unit 102 in their vehicle may enjoy large reductions on insurance, if they are actually safe drivers. It is considered that about 10% of the drivers are less careful and account for 90% of the accidents. Identifying those careful drivers in the 90% allows giving those drivers substantial reductions. Alternatively or additionally, the score may be used for driver testing and/or training. Optionally, after receiving a license, new drivers are required to drive a predetermined mileage with monitoring unit 102 in their vehicle, in order to prove safe driving. Further alternatively or additionally, parents may install monitoring unit 102 in a vehicle used by their children in order to keep track of the driving habits of their children.

As mentioned above, in some embodiments of the invention, in addition to generating reports, control station 130 may generate a driver profile used in determining which warnings are to be received by the driver. For example, a driver that has a high level of problems in properly exiting curves entered at high speed is assigned high level warnings when approaching a curve at a high speed.

In some embodiments of the invention, the average time between displaying a warning and the driver responding to the warning is determined. Optionally, according to the determined response time, the time at which to display warnings is determined.

In some embodiments of the invention, the average speed of the driver is determined and/or the average speed above the speed limit. Warnings on speeding are optionally provided only when the driver substantially exceeds the average speed. In some embodiments of the invention, the driver may indicate (e.g., through user interface 120) areas where it is desired to receive warnings more than in other locations. Optionally, the driver may indicate areas where there are frequently police crews for catching speeding vehicles and in these areas warnings are provided on lower speeds than in other areas. Alternatively or additionally, the indication of areas where police crews are commonly located are received from other vehicles or from other information sources.

Optionally, the driver profile is based on a weighted average of the driver's behavior over the entire monitored period. In some embodiments of the invention, acts performed more recently are given more weight. Alternatively or additionally, the driver profile may include a short term rating of the current driving session. For example, if the speed in the current session is much higher than the driver's average and/or the braking habits are indicative of a hurrying person, more warnings are provided than in regular circumstances and/or warnings relating to a person in a hurry are provided. In some embodiments of the invention, the long term driver profile is determined by control station 130 and is provided periodically to monitoring unit 102. The short term driver profile of the current session is optionally determined by monitoring unit 102. Alternatively, the entire driver profile is determined by control station 130 or by monitoring unit 102.

The driver profile optionally indicates whether the driver acts according to provided warnings. In some embodiments of the invention, the behavior of the driver for the same sign is compared for a plurality of cases in which a warning was provided and a plurality of cases in which a warning was not provided. Accordingly, the effectiveness of the warnings is determined.

It is noted that the driver profile may also be based on general information on the driver (e.g., age, experience) and general knowledge on the warnings desired by people in similar demographical properties.

Referring in more details to removing (310) identification from the data, in some embodiments of the invention, in removing the identification from the data sufficient data is removed so that the data is mixed with data from at least a predetermined large number of vehicles (e.g., at least 50-100). Thus, even if the authorities put obtain the information there is no way to prove the relation between the data and a specific driver or vehicle. This is important in some cases for convincing drivers to employ monitoring unit 102 in their vehicle and thus enhance their safety. In some embodiments of the invention, however, the data is stored with identification information, for example when the vehicles belong to a company interested in close monitoring of the behavior of their drivers.

Referring in more detail to determining (312) general statistics, in some embodiments of the invention, general statistics are generated for types of vehicles. The analysis for all the vehicles 150 of the same type are combined together, for example by averaging, and specific problematic behaviors which appear in specific vehicle models are determined. Analysis by humans is optionally performed to determine the reasons for the problematic behavior in the specific vehicle models. For example, the reasons may be, on the one hand, sociologically related to drivers of specific vehicles, or may be related to the human engineering of the specific vehicle.

General statistics may also be collected and analyzed for various driver attributes, such as age and gender.

General statistics are determined, in some embodiments of the invention, for road segments. For example, road segments in which a large number of abrupt brakings are performed may be tagged as dangerous.

The general statistics are optionally used to generate mapping information for memory unit 116 and/or control station 130 and/or keep the mapping information up to date. For example, areas in which the elevation acceleration is indicative of a bumpy road are marked as such in the mapping information. Thereafter, warnings are provided to other vehicles entering the area. General statistics may be used for identifying stop lines (e.g., based on the positions at which most cars stop near stop signs), and possibly even for identifying the existence of stop signs or traffic lights. In some embodiments of the invention, road segments in which vehicles slow down and undergo lateral deceleration are identified as curves. In some embodiments of the invention, attributes of the curve, such as the speed, location and/or angle, are determined from the behavior of the vehicles. Intersections are optionally identified as locations where vehicles enter from different directions. Alternatively or additionally, intersection entrance points at which vehicles slow down are identified as including a yield sign. Traffic circles are optionally identified according to the maneuvers of the vehicles in the traffic circle.

Optionally, the general statistics are used to determine road segments where there are heavy traffic loads and/or rush hour times. The overload of roads is optionally determined according to braking and/or speed profiles of many vehicles that are indicative of slow traffic.

In some embodiments of the invention, the road load mapping is performed in real time, such that real time tips to drivers, indicating a best route, may be provided, using methods known in the art.

Optionally, the general statistics are used to determine the prevailing speed on road segments. The prevailing speed is optionally the average speed of vehicles on the road segment or the average of the speed after removing extreme speeds (e.g., speeds of 20 km/h greater or lower than a range including 50% of the vehicles).

In some embodiments of the invention, the general statistics are used to determine causes of accidents and/or near accidents. Accidents and/or near accidents are optionally identified according to severe deceleration readings. When several accidents or near accidents are identified at a same location, the parameters of the vehicles in the vicinity of these locations are analyzed. For example, a tendency to speed at curves, to slow down too close to an intersection or a tendency not to identify traffic light changes may be identified.

The general statistics are used, in some embodiments of the invention, to determine the number of cars passing on specific roads, for advertisement exposure analysis. The exposure analysis may be based on the number of passing vehicles at a speed which allows receiving the message of the advertisement. In some embodiments of the invention, statistical information on the passing drivers (e.g., age, gender) is also determined.

The general statistics may be used to determine traffic loads and/or best routes in order to avoid traffic.

In some embodiments of the invention, exposure of traffic signs is determined by comparing the percentages of drivers obeying the signs. Signs having a very low obedience level may be blocked by a tree or otherwise unclear and/or may not seem sensible to drivers.

As described above, monitoring unit 102 includes a limited number of sensors which are relatively low cost. In other embodiments of the invention, more expensive sensors are used and/or a plurality of different sensors are used for redundancy in case of malfunctioning and/or in order to increase accuracy.

Following is a discussion of the various data collected and some of the possible sensors that may be used to collect the data in accordance with some embodiments of the invention. Time is optionally determined through a GPS receiver (or any other equivalent location determining unit, such as EU Galileo), a clock internal to monitoring unit 102, a clock of vehicle 150 and/or timing signals broadcast from control center 130.

Location is optionally determined by GPS readings. In some embodiments of the invention, regular GPS readings are used. Optionally, GPS readings received while a relatively strong acceleration (e.g., above about 0.1-0.2 g) is affecting vehicle 150 are discarded and replaced by an extrapolation of previous GPS readings. Optionally, the readings of about 2-3 seconds are discarded because of the acceleration, in order to avoid the inaccuracies in such GPS readings.

Optionally, in order to provide more date samples, GPS readings are extrapolated (e.g., to a rate of 10-20 samples a second) based on the previous GPS reading considered reliable and vehicle dynamics (e.g., the azimuth, speed and acceleration) of the vehicle at the time the previous GPS reading was acquired. Alternatively or additionally, acceleration measurements taken after the GPS readings were acquired are used in the extrapolation.

Alternatively or additionally, the coordinates from the GPS are corrected based on correction factors from a look up table, based on the speed and/or acceleration of vehicle 150 at the time the GPS readings were acquired. For example, in a velocity of 72 km/h the GPS may experience delay of 1 second in determining its actual position. Therefore, assuming in this case, a straight road and constant velocity, the system would deduce that the actual position is 20 meters ahead of the actual GPS reading.

Further alternatively or additionally, a map of the roads is stored in memory unit 160 and the location is corrected by fitting a segment of the location GPS readings onto a matching segment of the road coordinates of the map. The results of the comparison may be used for intermediate corrections until accurate fitting is performed, for calibration of the location readings and/or for computing a local digression parameter. Optionally, the comparison to the map is performed at a low frequency, such that the map does not need to be stored on vehicle 150. Rather, either the required map is transmitted to the vehicle or the GPS readings are transmitted to control station 130 for performing the fitting onto the map. Alternatively, the map is stored in memory unit 116.

Alternatively or additionally, any high accuracy GPS method known in the art, is used, such as differential GPS (DGPS), WAAS or INS (inertial navigation system). Further alternatively or additionally, a gyro is used to correct the GPS readings. In some embodiments of the invention, stationary transmitters which supply their accurate coordinates to passing vehicles 150 are positioned at various road locations. The stationary transmitters may transmit their coordinates to passing vehicles using any method known in the art, such as short range RF and/or infrared. The coordinates from the stationary transmitters are used by the vehicle to calibrate its location information. The stationary transmitters are optionally positioned at important locations, such as on stop signs, traffic lights and/or near road curves. In some embodiments of the invention, cellphone positioning methods are used.

In some embodiments of the invention, the location information used by monitoring unit 102 is of low accuracy, while control station 130 receives the raw GPS readings, corrects them and provides high quality location information for the report generation and/or transmits the corrected information back to monitoring unit 102. Alternatively or additionally, monitoring unit 102 performs some accuracy enhancement while control station uses a stronger accuracy enhancement.

The lighting conditions of the roads, are optionally determined based on the time, the geographical location of the vehicle and access to a look up table that indicates the times at which night begins and ends at the different locations and the different dates. Alternatively or additionally, a light sensor is used to determine the light intensity outside the vehicle.

Speed is optionally determined from the GPS readings, optionally from the corrected GPS readings. In some embodiments of the invention, the speed as determined from the GPS readings is corrected based on the readings from accelerometers 106. Further alternatively or additionally, readings are received from the speedometer of vehicle 150 and/or from a dedicated speedometer of monitoring unit 102.

The azimuth of vehicle 150 is optionally determined using the GPS readings. As mentioned above, the azimuth is optionally used with the speed to estimate the location when GPS readings are not sufficient and/or not available.

Optionally, when a few signs or coordinate pairs in the database of memory unit 116 are in the same area, each of the signs is assigned an azimuth, of the direction of traffic to which it is applicable. In determining for vehicle 150 whether a specific sign is applicable, the azimuth of vehicle 150 is compared to the azimuth of the sign.

The road smoothness is optionally determined based on the elevation accelerometer readings. The smoothness may be used to determine whether the vehicle is on a road or, for example, a dirt path. When not on a road, the location correction based on fitting to a map is not used.

The operation of the brakes is optionally determined from the accelerometer readings. Alternatively or additionally, monitoring unit 102 connects to the braking system and/or to the vehicle computer.

Weather information is optionally determined by receiving a general forecast. Alternatively or additionally, monitoring unit 102 includes a thermometer and/or humidity sensor. Further alternatively or additionally, monitoring unit 102 receives temperature information from a thermometer of the vehicle. In some embodiments of the invention, a camera acquires images of the road beneath and/or in front of the vehicle, and the weather is determined using image processing methods which identify rain, snow and/or low visibility conditions. Wind levels may be determined from the general forecast and/or from the accelerometer readings. Alternatively, a wind sensor is mounted on the vehicle. Other weather related sensors may be used as well.

The powering of vehicle 150 is optionally determined from its movement (e.g., from GPS readings) and/or from a microphone which senses the noises of the motor and/or movement. Alternatively or additionally, a sensor is connected to the power switch of the vehicle. In some embodiments of the invention, monitoring unit 102 determines cases when vehicle 150 moves while the motor is not operative or the gear is in neutral (for example, based on coupling to the gear control).

Operation of the signaling light is optionally determined by a microphone with sound recognition or by connecting to the vehicle signaling controls. Alternatively or additionally, light sensors identify the blinking signals on the dashboard or on the vehicle.

In some embodiments of the invention, a radar and/or a camera is used to identify obstacles and/or people on the roads.

In some embodiments of the invention, a gasoline monitor is used to keep track of the gasoline usage in each road segment. Optionally, the generated reports show the gasoline usage for each road segment and indicate the reasons for high gasoline usage, when such high usage occurs.

In some embodiments of the invention, vehicle load or overload is determined by a driver indication. Alternatively or additionally, information on the load is received from a weighing station which weighed the truck when the truck went on its journey, for example through control station 130. Further alternatively or additionally, the load of a truck is determined according to its acceleration profile. The load and/or weight of vehicles is optionally taken into account in determining which warnings to display to the driver and/or when the warnings are to be displayed. The weight may also be used in preparing the safety score and/or reports for the vehicle.

Optionally, the report indicates the percentage of time in which a trailer is connected to the truck and/or a number of occasions in which a lateral force above a predetermined strength is applied to the truck with and/or without the trailer.

The distance to the car in front or in back of vehicle 150 is determined, in some embodiments of the invention, by a camera that identifies an object of known size (e.g., the license plate) on the other car. The distance to the car is then calculated based on the ratio between the known size and the size on the image. Alternatively or additionally, a laser distance measurement unit is mounted on vehicle 150.

It is noted that when data can be gathered by a plurality of different sources employed by monitoring unit 102, the data from the different sources is used to provide better accuracy. Alternatively or additionally, when one of the sources breaks down, data from the other source is used to cover for the malfunctioning source.

In some embodiments of the invention, stationary sensors are used at important locations. Optionally, in accordance with some of these embodiments, cat eye weather sensors are placed on the roads and they transmit the weather conditions in their vicinity to control station 130 and/or to passing vehicles. Alternatively or additionally, stationary cameras and/or radars provide information on obstacles and/or road conditions.

In some embodiments of the invention, the generated reports include also information based on periodic inspection of vehicle 150, to determine parameters such as its maintenance quality. Alternatively or additionally, the periodic inspection results are used in determining the insurance rates to be charged for insuring the vehicle.

The inspection may include a human inspection or an automated computer controlled inspection. Optionally, the inspection includes examining one or more of tires, brakes, suspensions, steering system, gear, airbags sensors, engine, vehicle computer, mileage counter, external vehicle body and shields and windshields.

Optionally, the results of the inspection are provided to a computer which provides a score to the vehicle accordingly. For example, a vehicle that has worn brakes is optionally considered more prawn to hard braking. Alternatively or additionally, if a vehicle's external body is bruised and damaged, it can be deduced that this vehicle is not treated carefully. The computer may give its scoring according to the current state of the vehicle and/or according to the changes in the vehicle since the last inspection.

Vehicles 150 may include cars, trucks, buses and other four-wheel vehicles. In some embodiments of the invention, vehicles 150 may include two wheel vehicles such as motorcycles or bicycles. Optionally, vehicles which carry monitoring units 102 include motorized and non-motorized vehicles. In some embodiments of the invention, vehicles 150 associated with a single control station 130 all belong to a single vehicle fleet. Alternatively, vehicles of different fleets are associated with a single control station 130.

The tasks of control station 130 may also be distributed in accordance with a hierarchy. For example, processing may be performed at regional control stations while management is performed in a central location.

In some embodiments of the invention, monitoring unit 102 is packaged in a durable housing, such that its contents are not damaged even under most car accident conditions. Alternatively or additionally, the housing is designed to prevent tampering with the contents stored by monitoring unit 102 or at least to prevent such tampering going unnoticed. In some embodiments of the invention, the contents of memory 115 are encrypted to prevent using the data therein by unauthorized people accessing the contents. Alternatively or additionally, before transmission to control station 130 and/or within control station 130, the data is encrypted.

In some embodiments of the invention, upon opening the package of monitoring unit 102, the contents of memory 115 are erased. Alternatively or additionally, the accumulated data in memory 115 are erased a predetermined time after they are collected and/or immediately after they are transmitted to control station 130 and/or used by processor 114 to generate warnings. These measures are optionally used to prevent breach of the driver's privacy. In some embodiments of the invention, the driver may activate a mechanism to prevent the automatic eraser, when so desired, for example after an accident when the information can be used by the driver to prove he/she acted properly. The non-eraser mechanism optionally requires entering a code, so that nobody other than the driver can easily activate the non-eraser. In some embodiments of the invention, the data is not erased and/or sufficient data is stored so that insurance claims may be checked as to whether they relate to events that really occurred or at least could have occurred (e.g., the vehicle was at the location claimed).

Monitoring units 102 may be considered mandatory by the insurance companies. In some embodiments of the invention, monitoring units 102 are lent to the drivers by an insurance company. The insurance company optionally purchases monitoring units 102. Alternatively or additionally, the insurance company pays a percentage of its savings due to the use of system 100, for the use of the system.

It is noted that all the elements of monitoring unit may be included in a single package, for example placed on the dashboard, glove compartment, under the hood or in the trunk, or may be distributed in a plurality of positions with vehicle 150. Possibly, some or all of the sensors are located outside the vehicle, beneath the vehicle, on its sides or on top.

As described above, in some embodiments of the invention, analysis required for generating warnings is performed by processor 114, while analysis required for ratings and reports is performed by control center 130. In other embodiments of the invention, some warning generation tasks are performed by control center 130. In accordance with these embodiments, the data required for determining whether a warning is required and/or when and where the warning is to be provided is transmitted to control station 130. Control station 130 analyzes the data to determine whether a warning is required and/or which warning is required. If a warning is required, a message is returned to monitoring unit 102 with information on the required warning.

Performing at least some of the warning analysis in control station 130 allows using more up to date data available to control station 130 in the analysis, without keeping the databases on monitoring units 102 of all the vehicles 150 up to date. The more up to date data may include, for example, heavy mapping information, weather information, status of traffic lights (e.g., whether the light is red or green) and/or GPS correction data. Alternatively or additionally, the more up to date data includes information on the locations of other vehicles and/or the general traffic status (traffic jams, accidents, blocked roads).

In some embodiments of the invention, at least some of the analysis in control station 130 is performed at least a predetermined time after the data is received in order to allow for accumulating more mapping information on roads and/or traffic. Optionally, upon receiving the data from monitoring unit 102, the data is analyzed to extract general mapping data. A predetermined time thereafter (e.g., 6-12 hours later), the analysis for the specific vehicle is performed, using the mapping information collected for the time of the data. Optionally, mapping data which is dynamic (e.g., traffic loads, road obstacles) are tagged with timing data so that only applicable mapping data is used. Alternatively, the data is analyzed as close as possible to when it is received so that it can quickly be discarded due to privacy considerations.

In some embodiments of the invention, before discarding the information it is provided to the driver to allow appeal against adverse results. Optionally the driver may add a video camera to monitoring unit 102, so as to keep proof of his actions for appeal.

Alternatively or additionally, at least some of the report related analysis is performed already by processor 114. In some embodiments of the invention, all the analysis that requires data relating to specific events is performed on processor 114, so that private information which may be used to track the whereabouts of the driver of vehicle 150 does not leave monitoring unit 102. In some embodiments of the invention, at least some of the analysis tasks may be performed by either processor 114 or control station 130. The analysis is optionally performed on the unit that at the designated time has more available processing resources. Such processing tasks may include, for example, summing up scores determined for different classes.

Monitoring unit 102 may perform additional tasks to those described above. For example, monitoring unit 102 may include an SOS button and/or may be used for communication with a service station. Optionally, when the SOS button is pressed monitoring unit 102 sends some or all of the stored and immediate data it collected to a predefined destination, e.g., control station 130. The SOS button may also initiate other procedures such as open a voice channel to communicate in real time between the persons in the vehicle and people in a remote location. The SOS button may also initiate or suppress the operation of other systems connected to monitoring unit 102, physically or wirelessly.

In some embodiments of the invention, monitoring unit 102 may be used to give driving directions. The driving directions may be selected according to the driver profile. In some embodiments of the invention, the driving directions are selected to enhance safety rather than minimizing time.

Alternatively or additionally to the SOS button, upon identifying that a crash occurred, data is collected, stored and/or transmitted immediately to control station 130.

In some embodiments of the invention, monitoring unit 102 is configured through user interface 120. Alternatively or additionally, monitoring unit 102 can be reconfigured remotely from control station 130.

In some embodiments of the invention, instead of using wireless transmission, vehicle 150 periodically comes to a service station where data is downloaded to control station 130 through a wire cable. Alternatively or additionally, the data may be removed from monitoring unit 102 on a flash memory and transferred to a computer from which it is transmitted to control station 130, for example over the Internet. Preferably, the data is encrypted for transmission over the Internet.

It is noted that the information collected by monitoring unit 102 may be used to determine the routes frequently traversed by vehicle 150 and possibly the behavior of the driver on each of the routes. When the driver begins a new driving session, monitoring unit 102 may determine the direction in which vehicle 150 is proceeding and accordingly guess the destination of the vehicle. Alternatively or additionally, the determination of the route may be used to determine the driver profile to be used in the current session and/or particular warnings the driver requires for the specific route.

It will be appreciated that the above described methods may be varied in many ways, including, changing the order of acts, and the exact implementation used. In some embodiments of the invention, for example, no control station is used at all and all the processing and report generating is performed by monitoring unit 102. It should also be appreciated that the above described description of methods and apparatus are to be interpreted as including apparatus for carrying out the methods and methods of using the apparatus.

Although described mainly for daily driving, the principles of the present invention may be used to enhance the driving abilities and safety of racing drivers.

In some embodiments of the invention, a driver may be assigned a flash memory on which his identity and driving history is stored. Upon entering a vehicle, the driver inserts his flash memory to the monitoring unit 102 of the vehicle. Thus, analysis of the driver may be based on driving experience in a plurality of different vehicles. Alternatively or additionally, the driver inserts a driver code and the data collected in control station 130 is classified according to drivers. Optionally, the information of a single driver even when coming from different vehicles is used together in generating driver reports. In some embodiments of the invention, the types of the vehicles are taken into account in generating the driver report.

The present invention has been described using non-limiting detailed descriptions of embodiments thereof that are provided by way of example and are not intended to limit the scope of the invention. For example, system 100 may be used only for generating warnings or only for generating reports and does not have to be used for both tasks. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of analyzing the driving behavior of a driver or a vehicle, the method comprising:
monitoring, by a monitoring unit on board a vehicle, the driving behavior of a driver or a vehicle in a plurality of structurally similar road portions; and
determining a score for the driver or vehicle in said structurally similar road portions by comparing the driving behavior to at least one dynamically adjustable threshold.

2. The method according to claim 1, wherein said structurally similar road portions comprise curves.

3. The method according to claim 1, wherein said structurally similar road portions comprise intersections.

4. The method according to claim 1, wherein said structurally similar road portions comprise road bumps.

5. The method according to claim 1, wherein said structurally similar road portions comprise traffic lights.

6. The method according to claim 1, wherein said structurally similar road portions comprise road portions having a similar traffic sign.

7. The method according to claim 1, wherein said structurally similar road portions comprise highways.

8. The method according to claim 1, wherein said structurally similar road portions comprise city roads.

9. The method according to claim 1, wherein said structurally similar road portions comprise rural roads.

10. The method according to claim 1, further comprising calculating insurance rates for said vehicle based on said score.

11. The method according to claim 1, further comprising calculating a discount on insurance rates for said vehicle based on said score.

12. The method according to claim 1, further comprising, automatically generating, by a warning generator in the vehicle, a warning to the driver based on the score.

13. The method according to claim 12, further comprising, providing said warning remote from the vehicle.

14. The method according to claim 1, wherein the step of determining the score comprises comparing the driving behavior of the driver or vehicle to driving behaviors of other drivers or vehicles in said structurally similar road portions.

15. The method according to claim 1, further comprising updating the score based on continuous monitoring of the driver or vehicle in said structurally similar road portions.

16. The method according to claim 1, wherein said step of determining a score for the driver or vehicle in said structurally similar road portions comprises determining a plurality of scores for the driver or vehicle in said structurally similar road portions.

17. The method of claim 1, wherein the step of comparing the driving behavior to at least one dynamically adjustable threshold further comprises comparing the speed of the vehicle to a speed limit or to a prevailing speed at the plurality of structurally similar road portions.

18. The method of claim 17, further comprising the step of adjusting the dynamically adjustable threshold based on a curvature of a road the vehicle is driving on.

19. The method of claim 17, further comprising the step of adjusting the dynamically adjustable threshold based on weather conditions of a road the vehicle is driving on.

20. The method of claim 17, further comprising the step of adjusting the dynamically adjustable threshold based on a traffic load of a road the vehicle is driving on.

* * * * *

UNITED STATES PATENT AND TRADEMARK OFFICE
CERTIFICATE OF CORRECTION

PATENT NO. : 10,210,772 B2
APPLICATION NO. : 15/484636
DATED : February 19, 2019
INVENTOR(S) : Asaf Tamir and Ido Topaz Page 1 of 1

It is certified that error appears in the above-identified patent and that said Letters Patent is hereby corrected as shown below:

In the Specification

In Column 9, Line 36, the word --are-- should be inserted after the word "there"

In Column 23, Line 37, the first instance of the word "is" should be deleted and replaced with the word "if"

In Column 25, Line 8, the word "or" should be deleted and replaced with the word "on"

In Column 26, Line 56, the word "inn" should be deleted and replaced with the word "in"

In Column 27, Line 44, the "," after the word "passed" should be deleted and the word --and-- should be inserted after the word "passed"

In Column 27, Line 45, the "," after the word "intersection" should be deleted and replaced with a "."

In Column 34, Line 23, the word "put" should be deleted

Signed and Sealed this
Twenty-fourth Day of December, 2019

Andrei Iancu
*Director of the United States Patent and Trademark Office*